(12) United States Patent
Udwadia

(10) Patent No.: US 6,266,578 B1
(45) Date of Patent: Jul. 24, 2001

(54) COMPUTER BASED CONTROL SYSTEM

(76) Inventor: Firdaus E. Udwadia, 2100 S. Santa Anita Ave., Arcadia, CA (US) 91006

(*) Notice: Subject to any disclaimer, the term of this patent is extended or adjusted under 35 U.S.C. 154(b) by 0 days.

(21) Appl. No.: 09/139,033

(22) Filed: Aug. 24, 1998

Related U.S. Application Data

(60) Provisional application No. 60/085,561, filed on May 15, 1998.

(51) Int. Cl.$^7$ .............................. G05B 15/00; B25J 5/00
(52) U.S. Cl. .......................... 700/260; 700/250; 700/63; 318/568.12
(58) Field of Search ............................. 700/63, 246, 248, 700/258, 260, 261–263; 318/568.18, 568.22

(56) References Cited

U.S. PATENT DOCUMENTS

| | | | |
|---|---|---|---|
| 4,620,829 | 11/1986 | Herve | 414/720 |
| 4,663,726 | 5/1987 | Chand et al. | 345/515 |
| 4,807,153 | 2/1989 | Onaga et al. | 700/256 |
| 4,826,392 | 5/1989 | Hayati | 700/260 |
| 4,843,566 * | 6/1989 | Gordon et al. | 700/250 |
| 4,925,312 | 5/1990 | Onaga et al. | 700/261 |
| 4,990,838 | 2/1991 | Kawato et al. | 700/246 |
| 5,023,808 | 6/1991 | Seraji | 700/248 |
| 5,150,026 | 9/1992 | Seraji et al. | 318/568.11 |
| 5,179,514 * | 1/1993 | Rastegar et al. | 700/63 |
| 5,206,930 | 4/1993 | Ishikawa et al. | 700/260 |
| 5,336,982 * | 8/1994 | Backes | 318/568.22 |
| 5,390,288 * | 2/1995 | Toda et al. | 700/258 |
| 5,499,320 * | 3/1996 | Backes et al. | 700/260 |
| 5,550,953 | 8/1996 | Seraji | 700/263 |
| 5,594,644 | 1/1997 | Hasegawa et al. | 701/23 |

OTHER PUBLICATIONS

"On the Dynamics and Control of Constrained Mechanical and Structural Systems", Thesis by Hee–Chang Eun; 117 pp.; Apr. 1995.

* cited by examiner

*Primary Examiner*—William Grant
*Assistant Examiner*—Sheela Rao
(74) *Attorney, Agent, or Firm*—Sheldon & Mak

(57) ABSTRACT

A control system for operating any mechanical system, such as a non-linear robotic system, obtains and applies exact control forces so that the non-linear mechanical system satisfies desired trajectory requirements. The system enables a user to set trajectory requirements and allocate weighting factors to the control forces, the weighting factors being set at any values deemed appropriate to optimize the control forces. The trajectory requirements have a functional dependence on a physical measurement vector and time, a velocity of the physical measurement vector and time; or a combination of the two functional dependencies, the physical measurement vector being related to the displacement of one or more locations within the mechanical system. A microprocessor control computer of the system, being programmed with computational techniques that stabilize and speed the determination of the exact control forces, stores and processes the trajectory requirements and weighting factors with the measurements and plant characteristics, the computer sending a signal to the mechanical system to effect the control forces for exactly generating the desired trajectory while minimizing plant operating costs at every instant of time. In one embodiment, measurement of the displacement of an end-effector of a robot arm determines the control forces. Also disclosed is a method for operating the system.

19 Claims, 22 Drawing Sheets

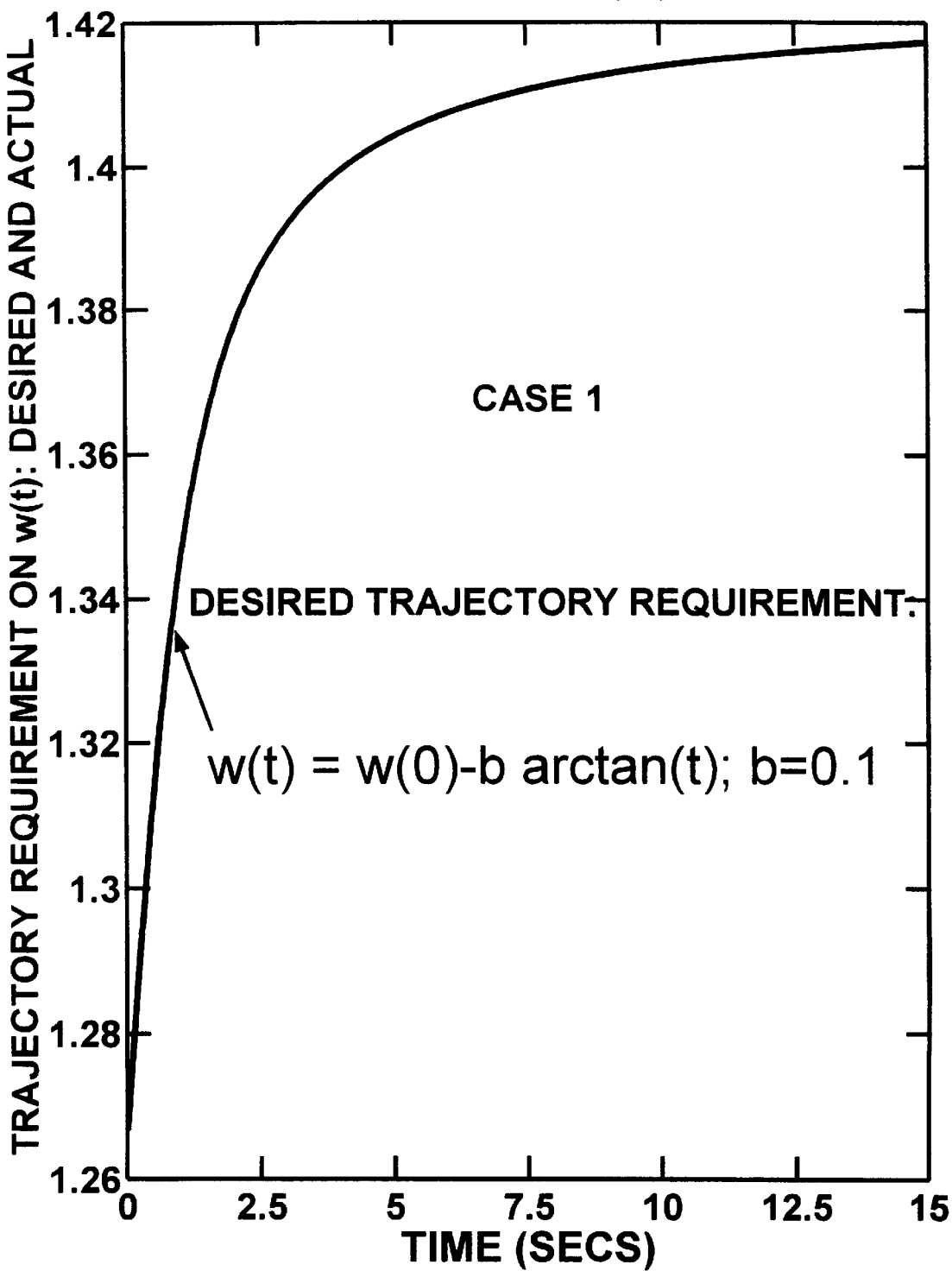

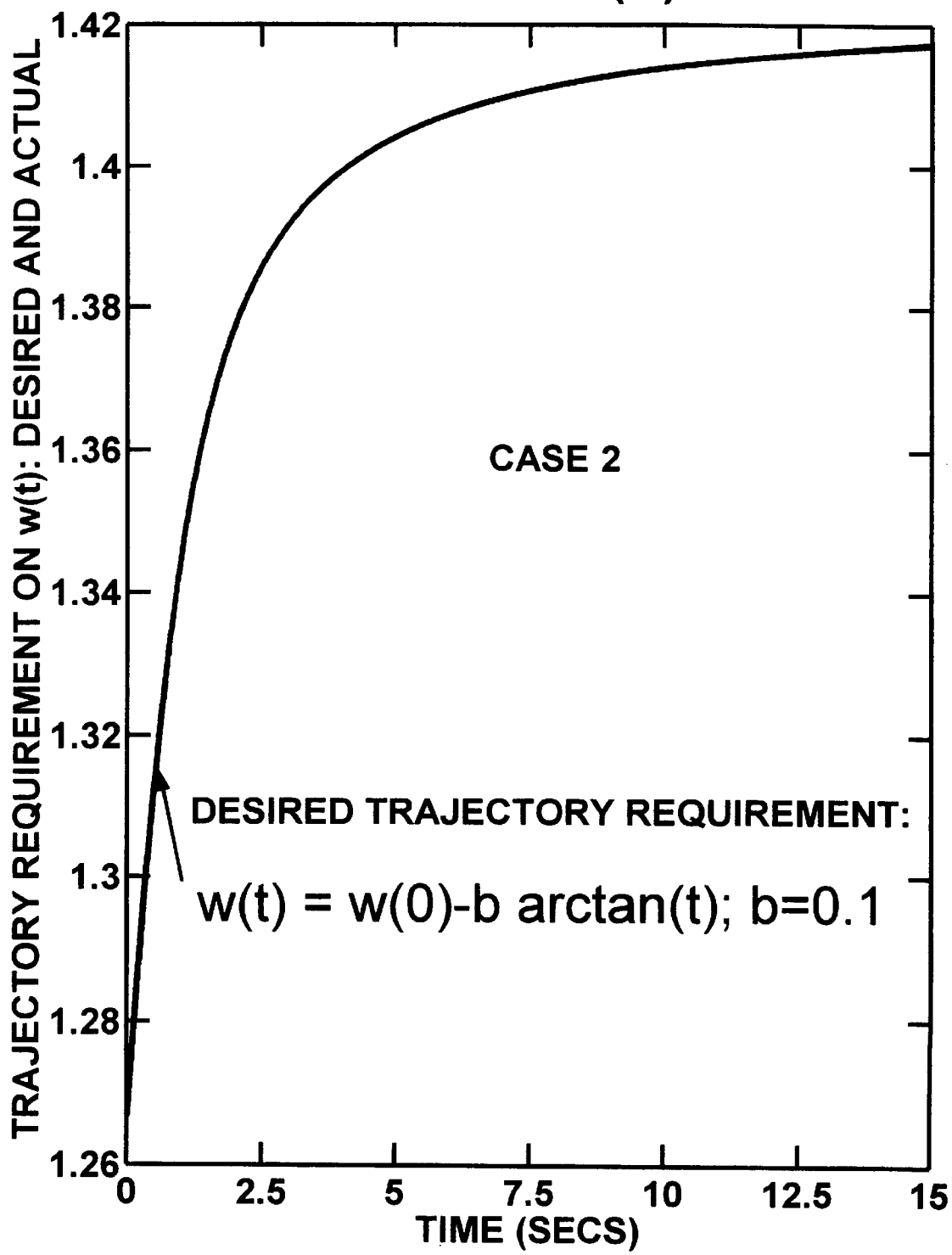

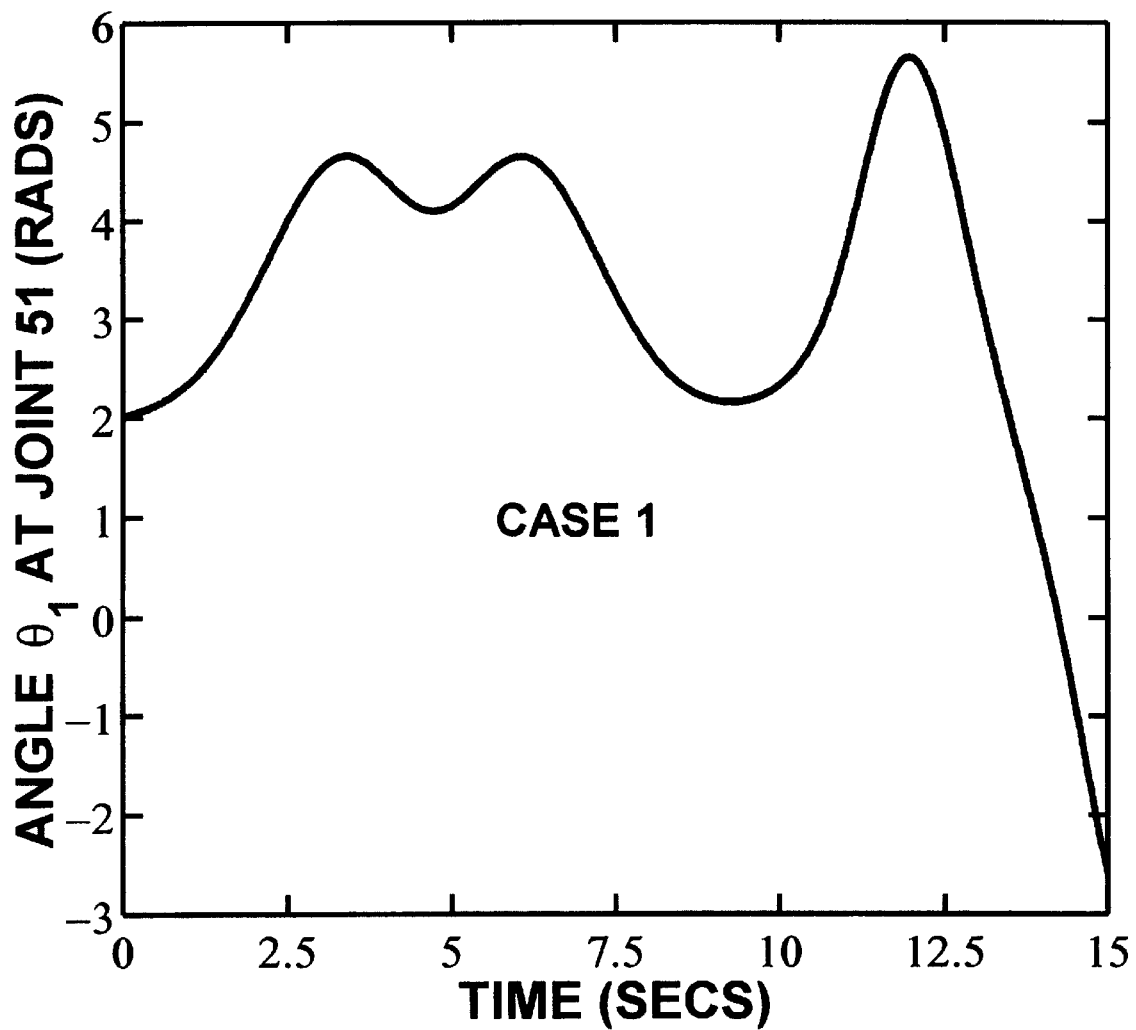

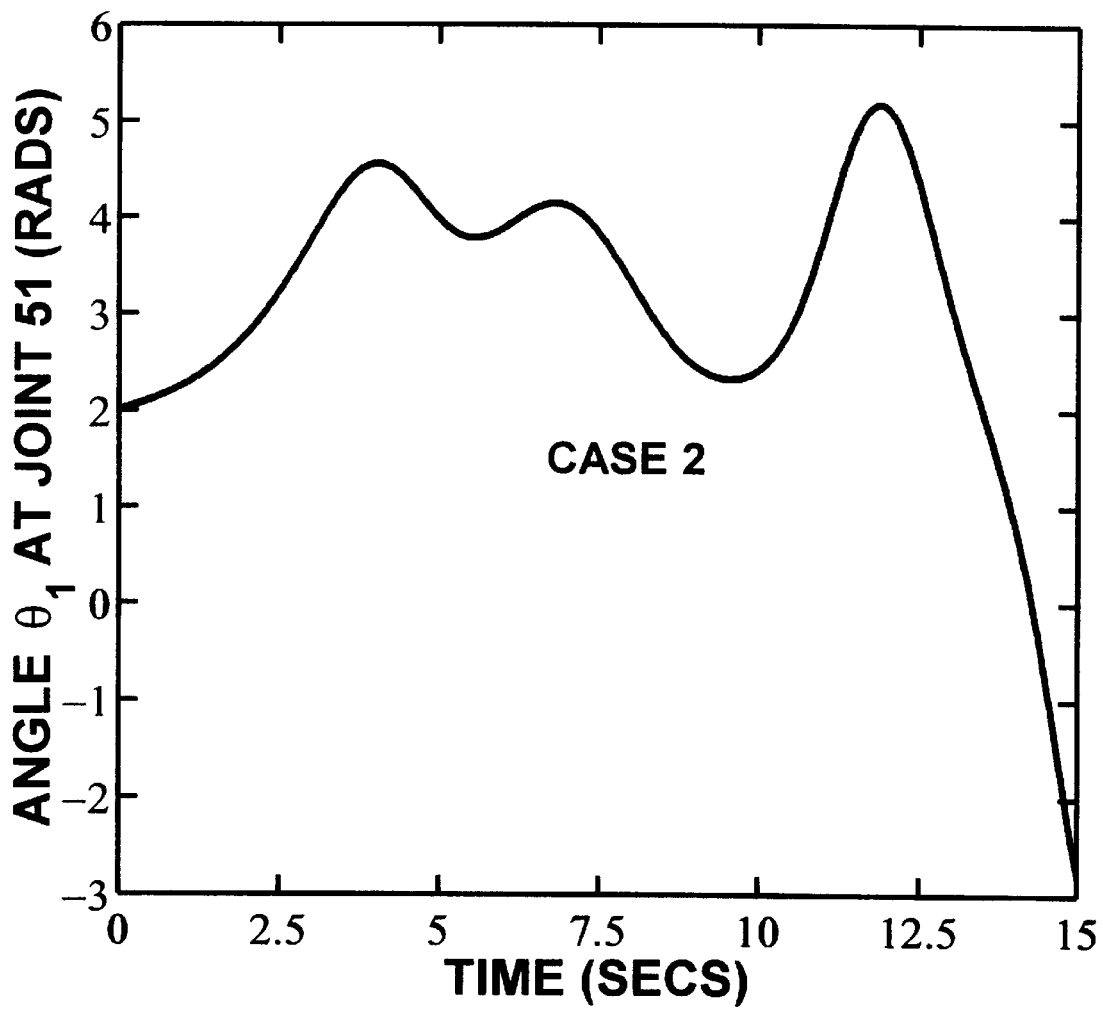

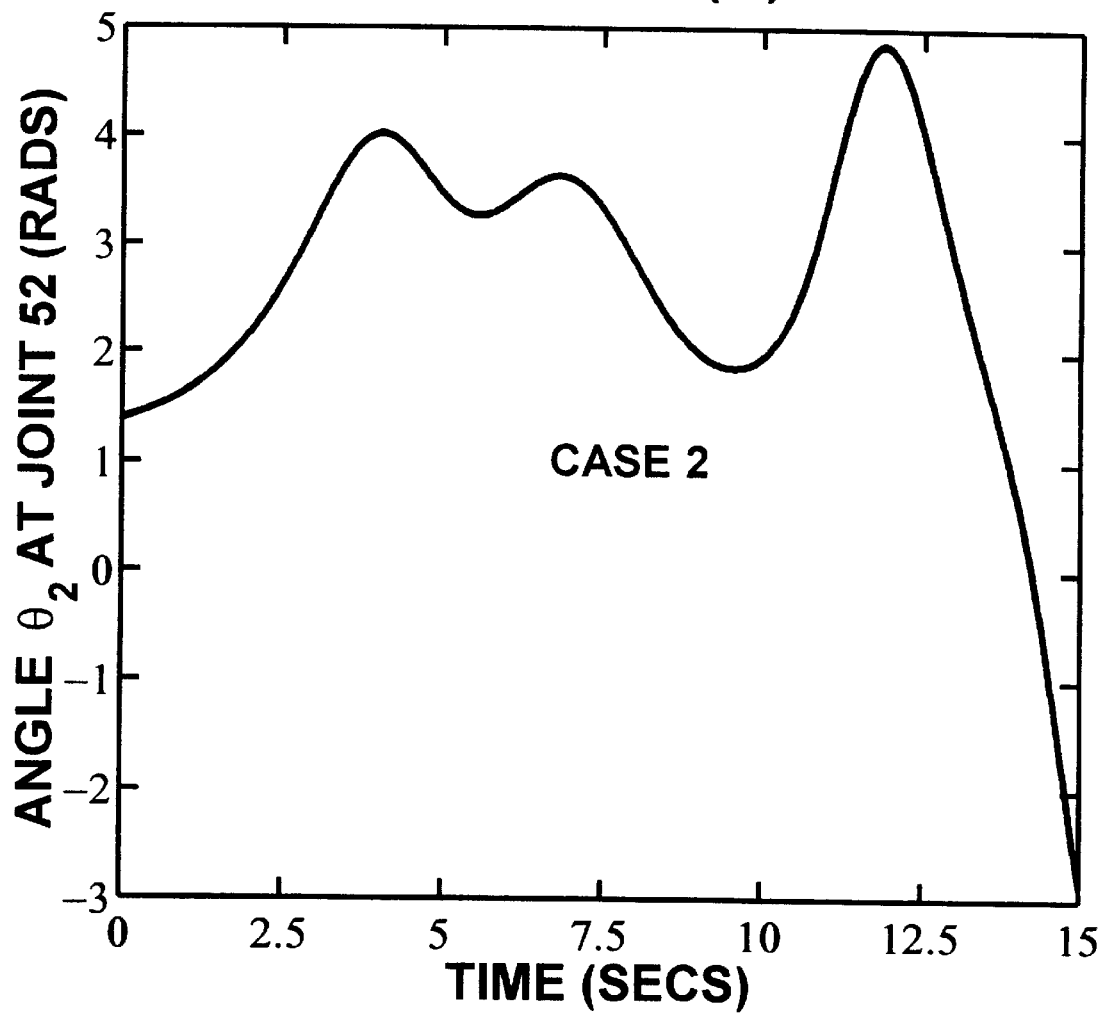

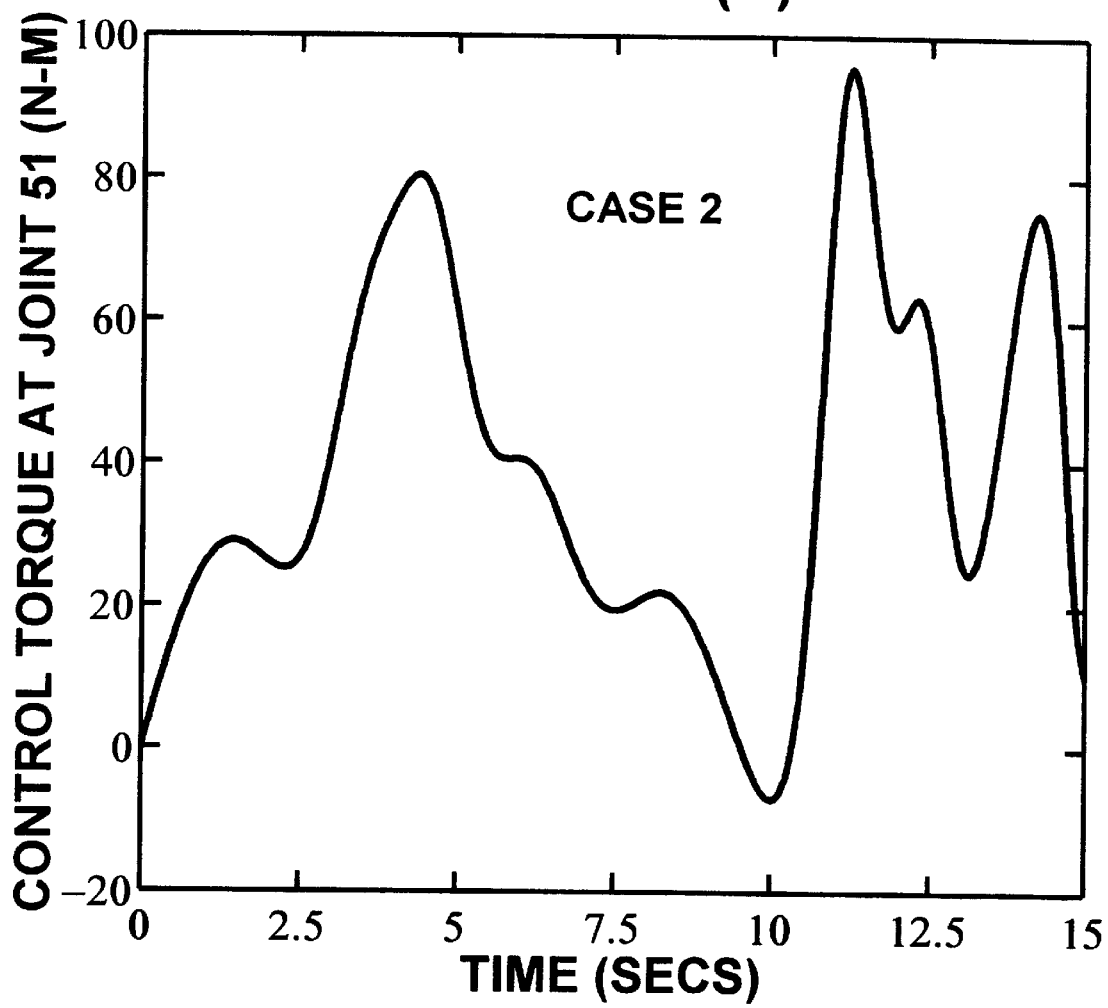

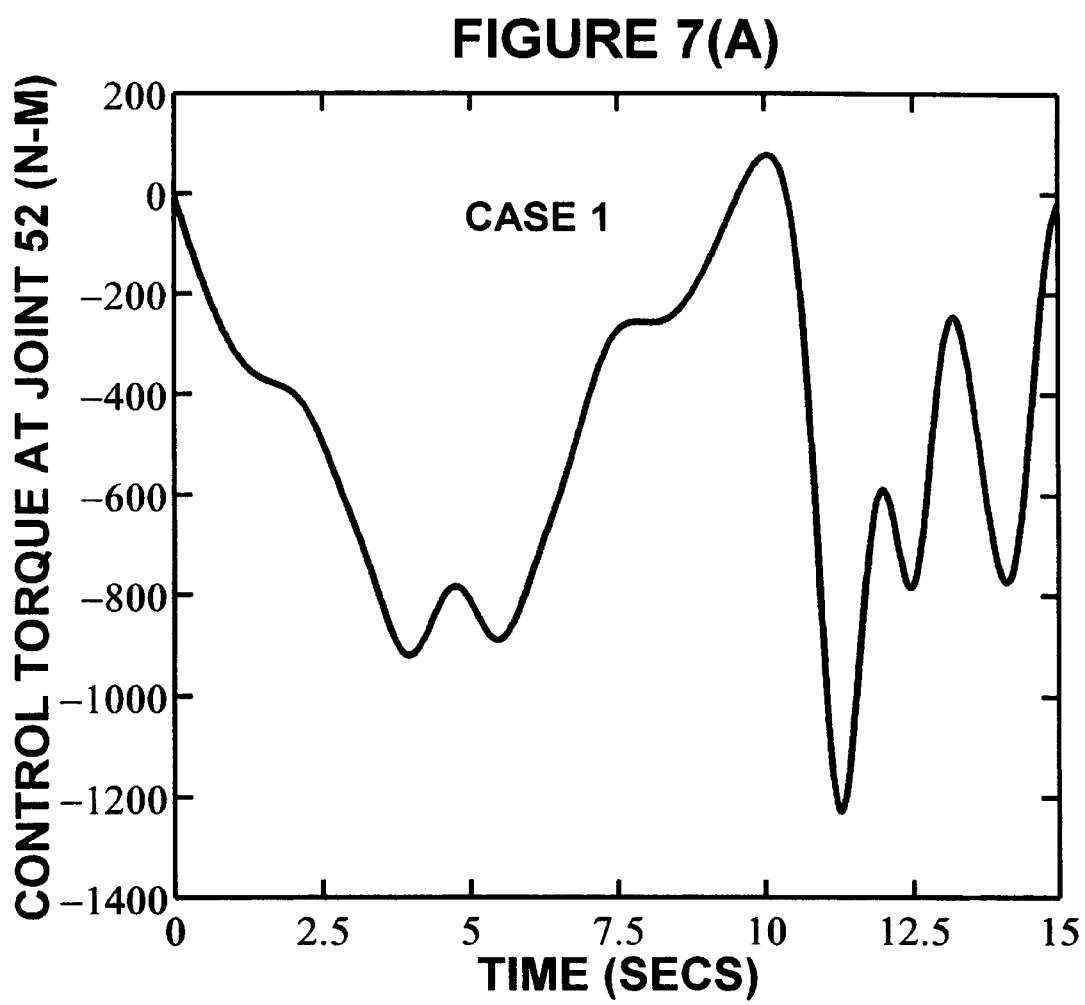

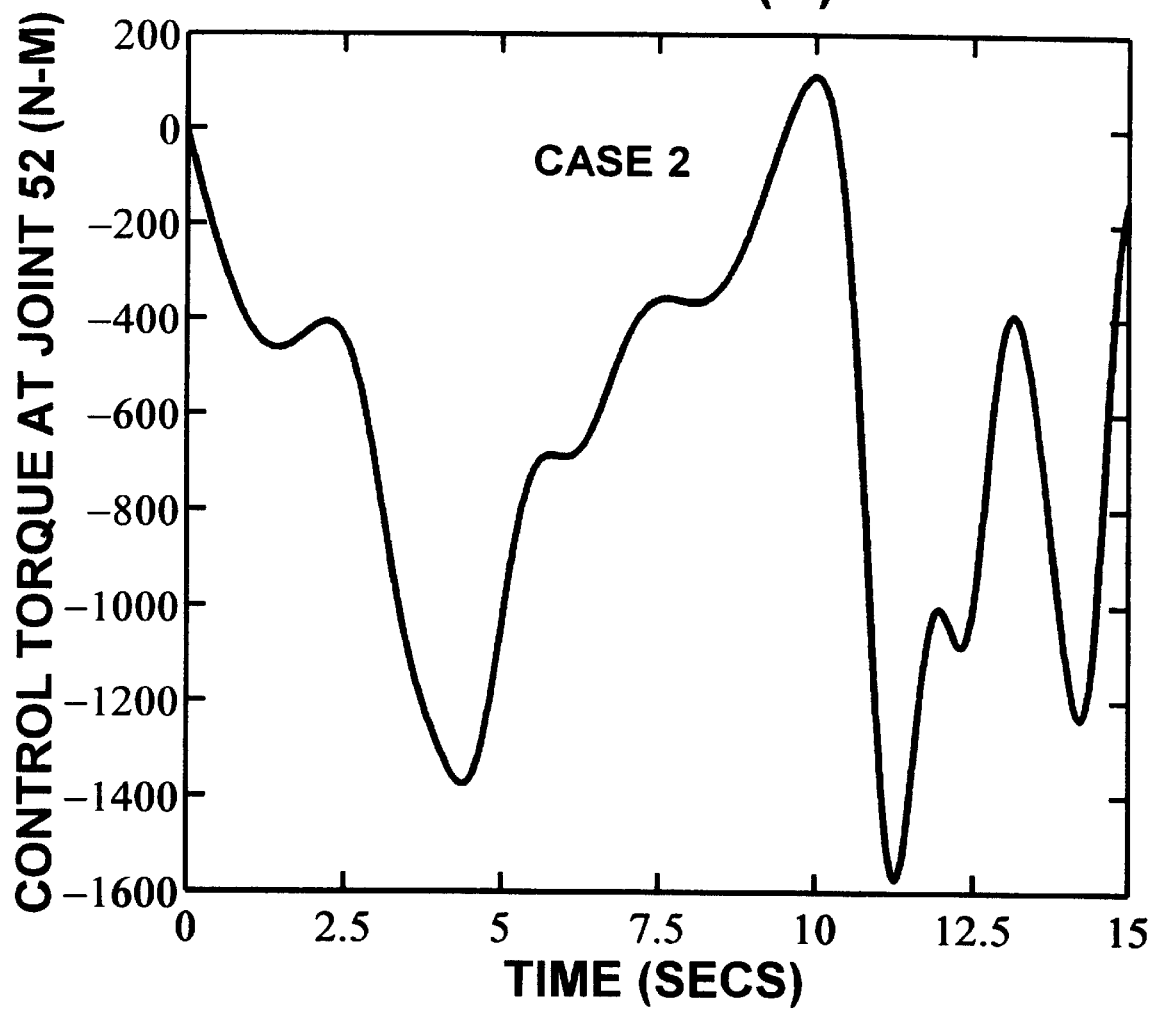

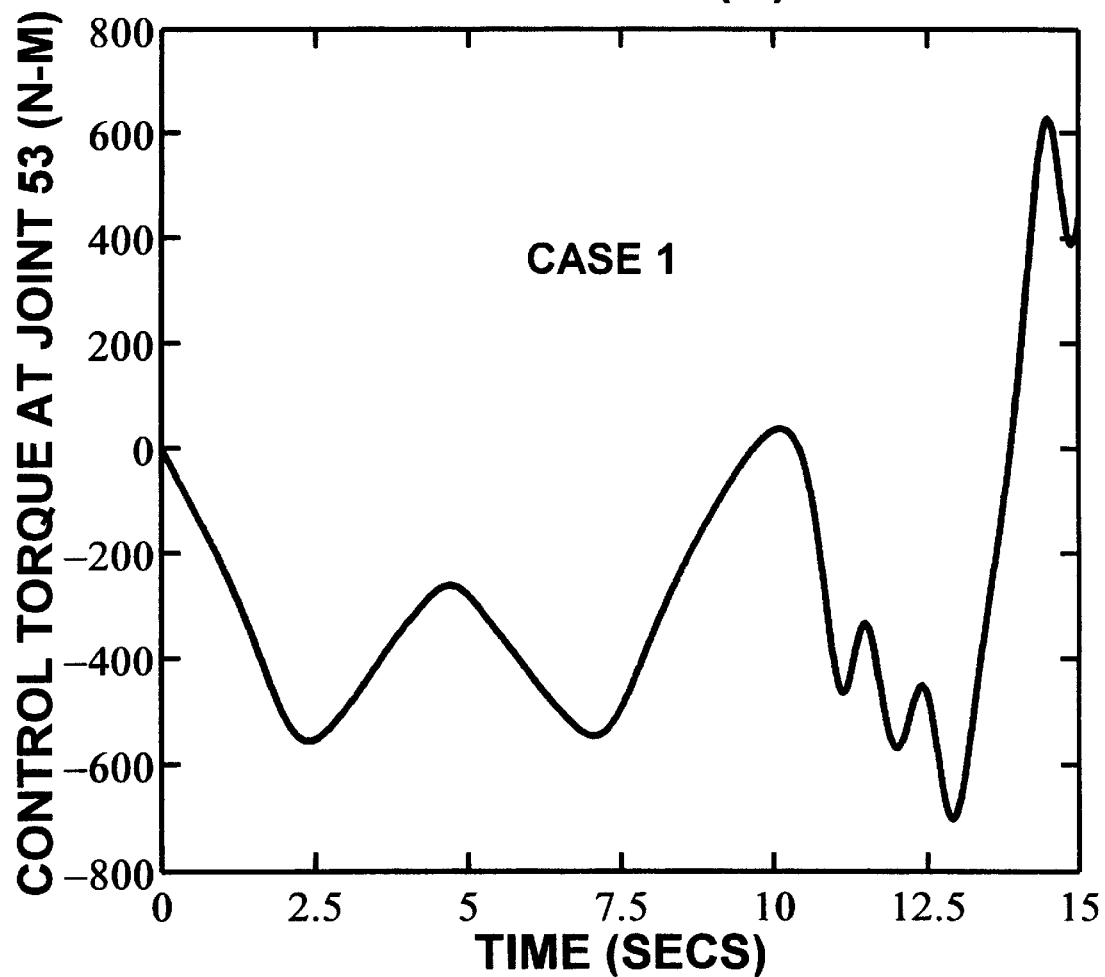

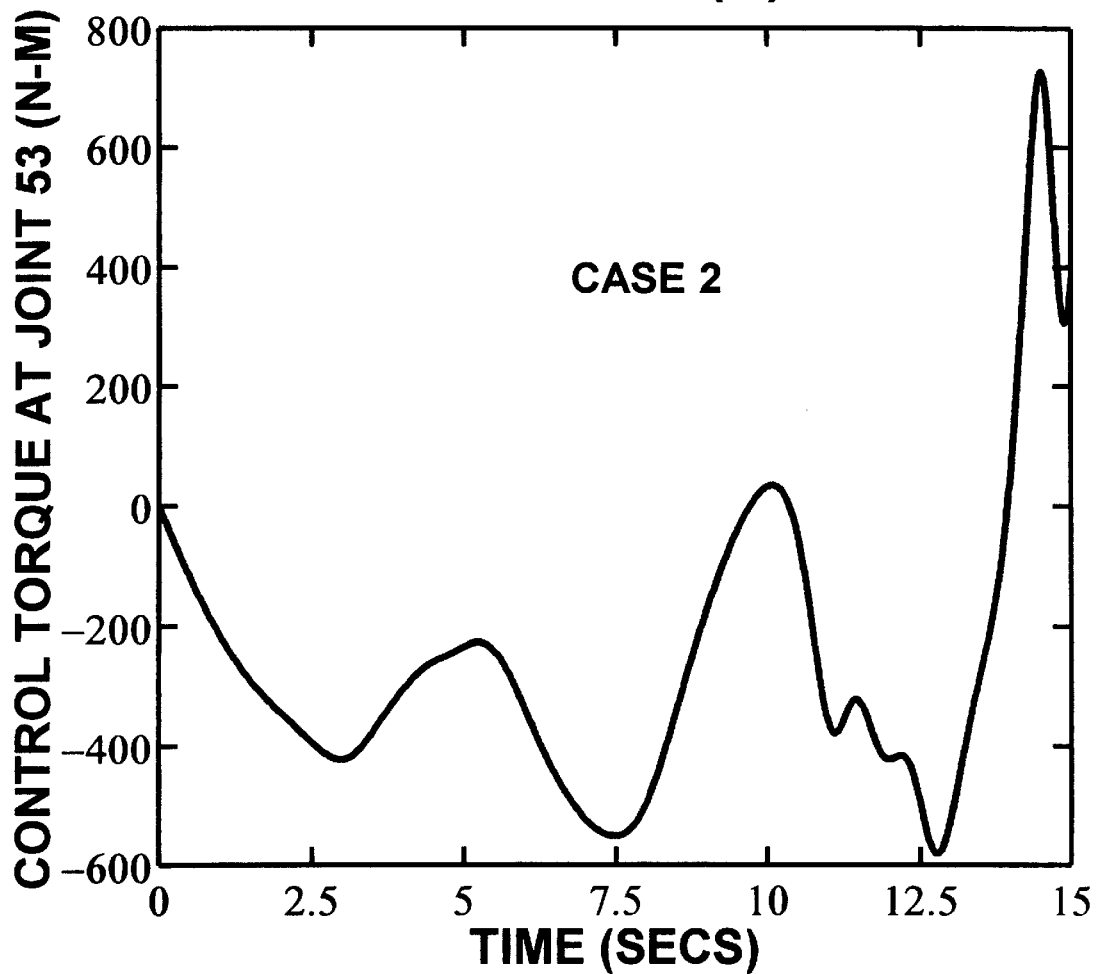

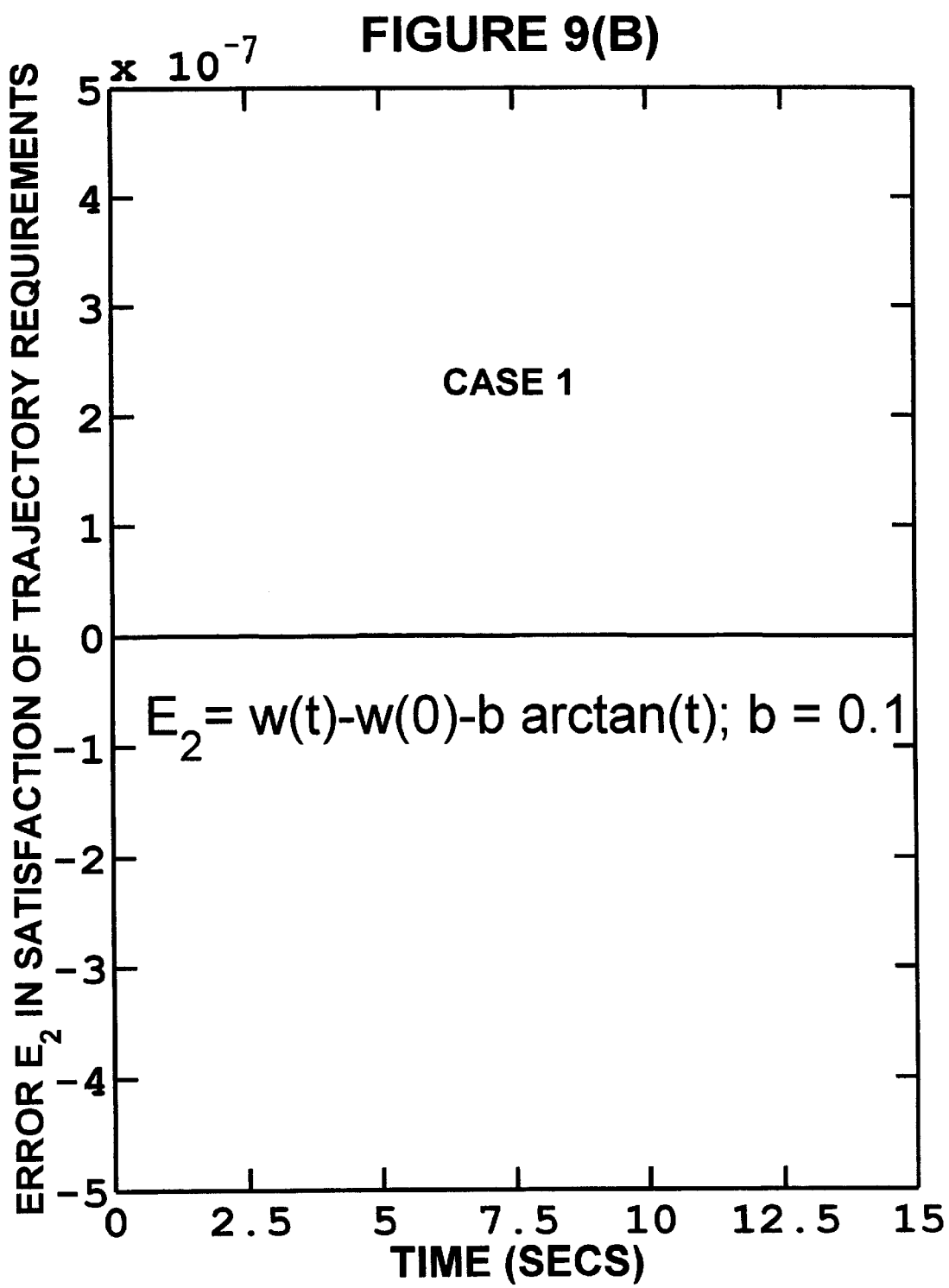

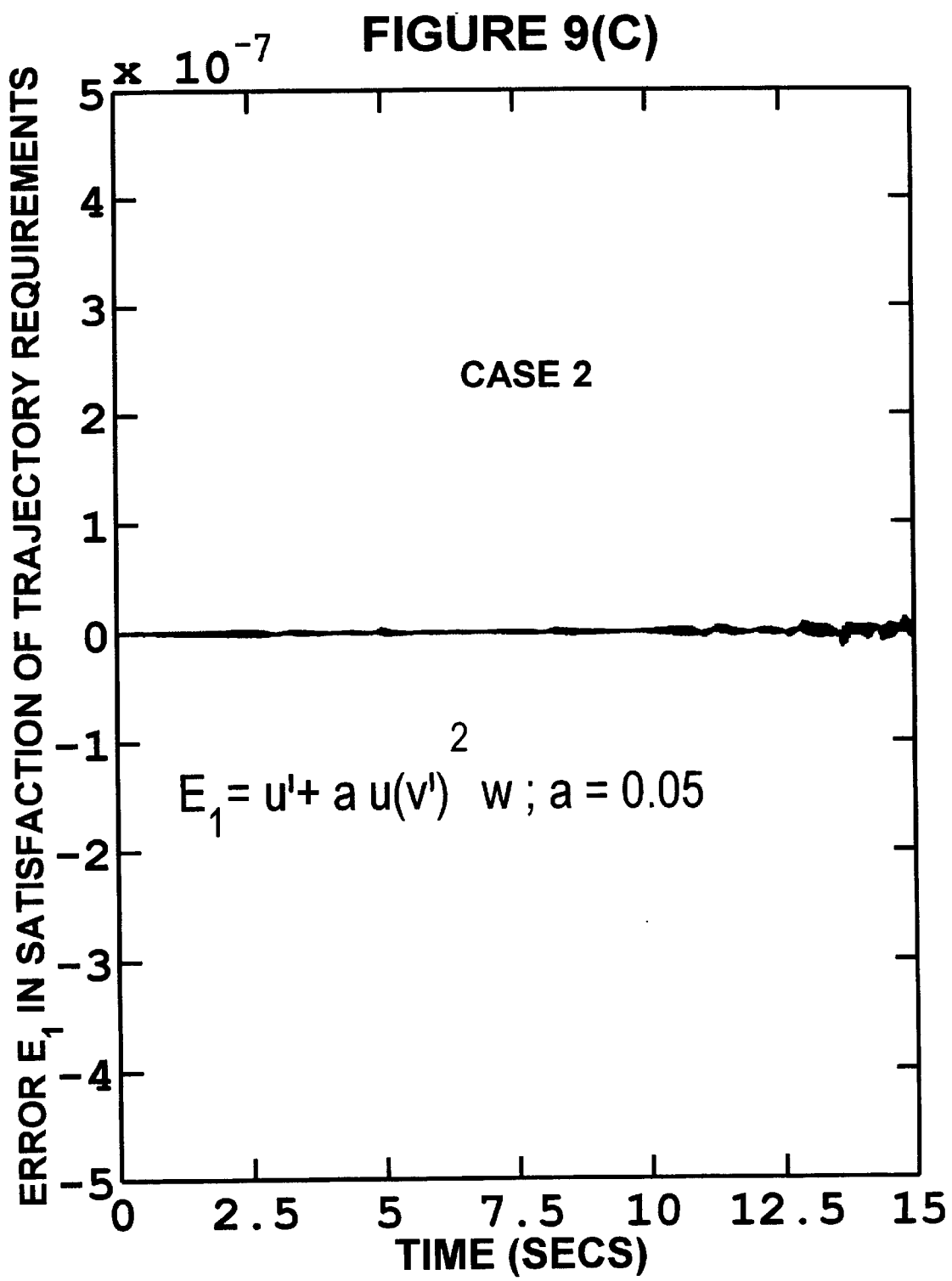

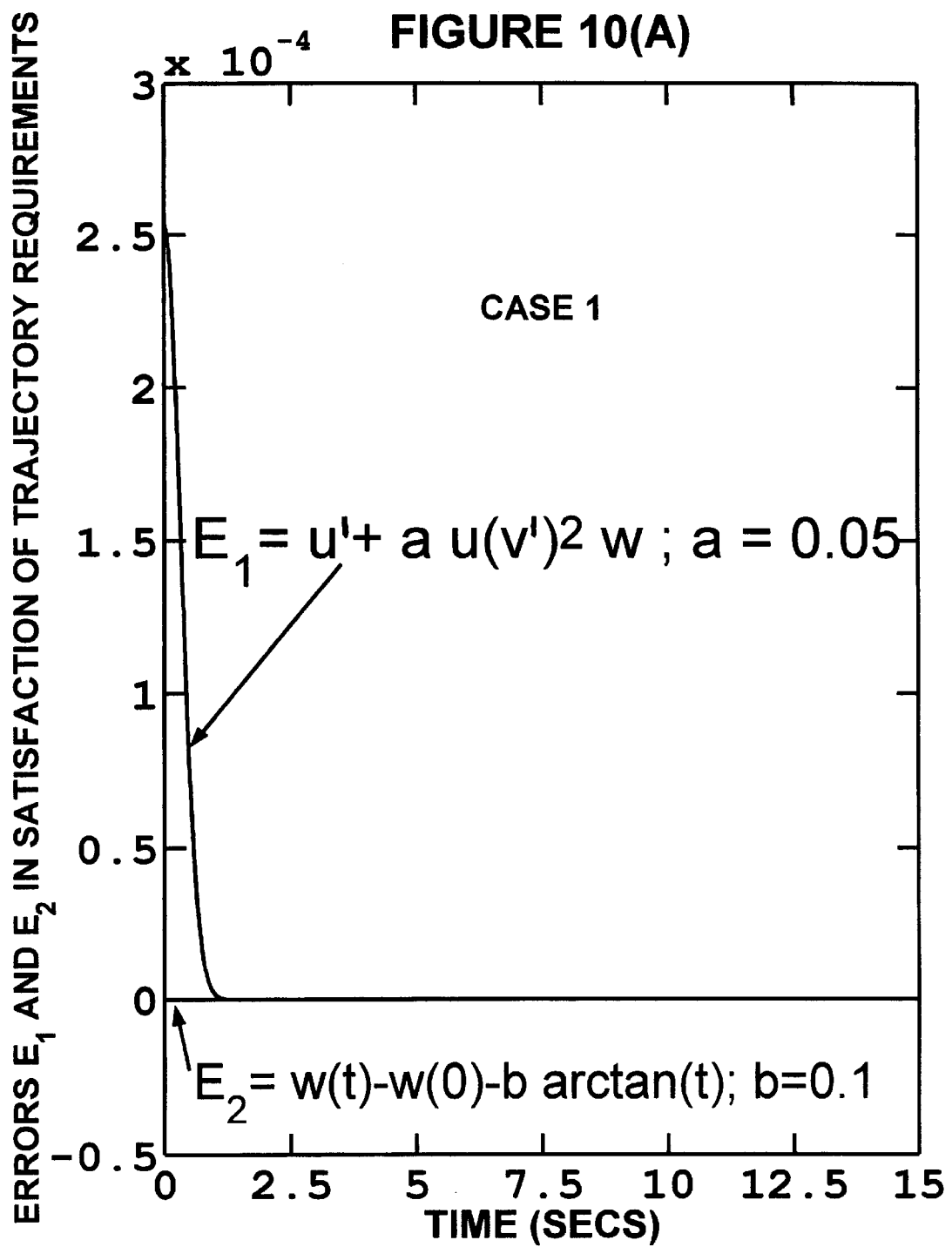

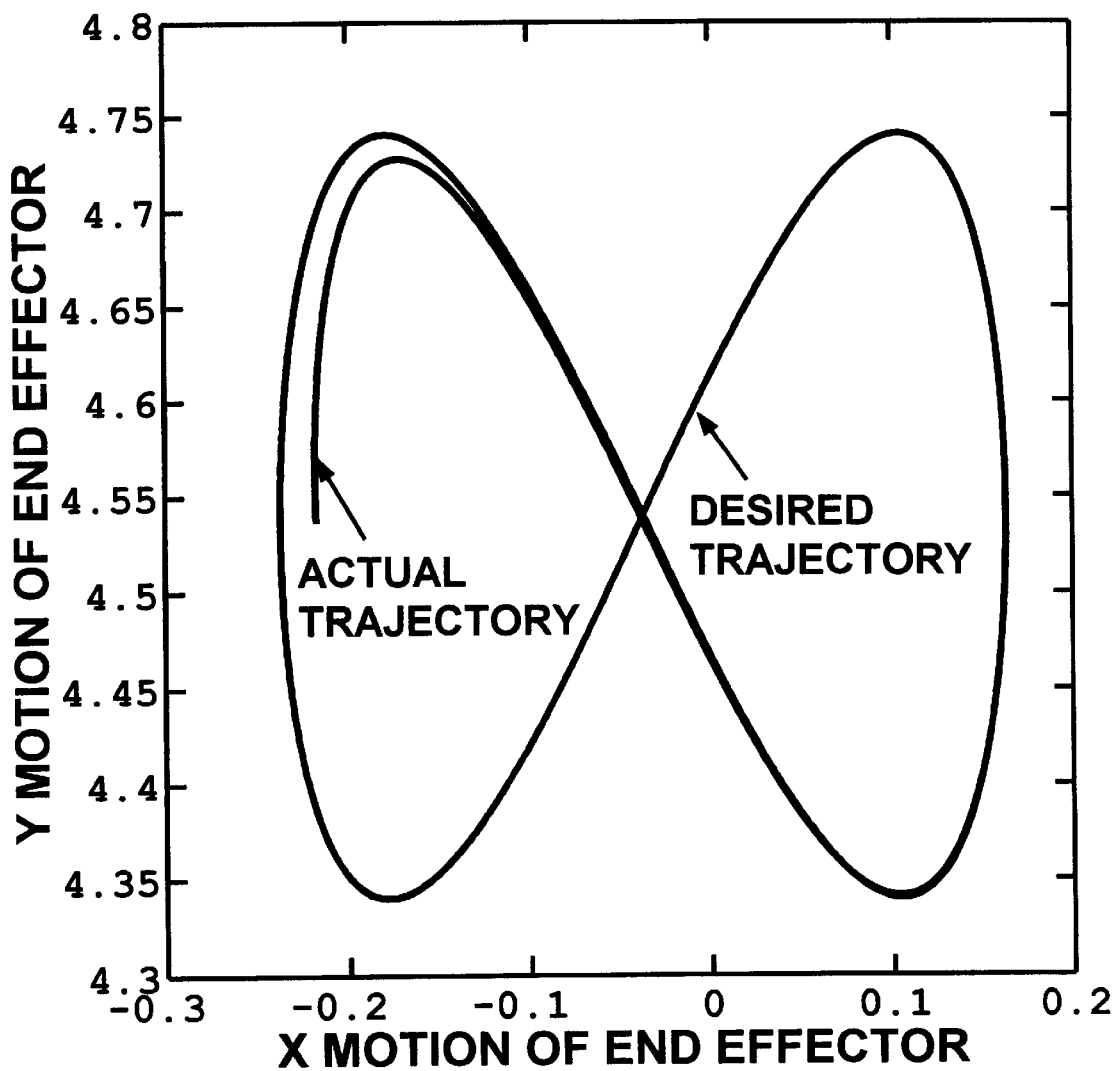

COMPUTER BASED CONTROL SYSTEM

RELATED APPLICATION

This application claims the benefit of U.S. Provisional Application No. 60/085,561, filed May 15, 1998.

BACKGROUND

The present invention relates to motion control, and more particularly to an improved microcontroller based control system for apparatus such as a robotics mechanism.

In the past, non-linear control problems required complicated intermediate steps involving linearization of differential equations. The linearization resulted in controls that were not exact, so that the required trajectory was not precisely followed by the mechanical system. Also, the computation of control force using linearized equations required powerful microprocessors.

Controls for mechanical systems (such as robotic systems, structural systems, etc.), have been developed using linear feedback, non-linear feedback, or non-linear cancellation. However, none of these systems provide a closed form, real-time control force signal for any prescribed trajectory. The required feedback and the computation of linearized equations make the control force signal computationally expensive and imprecise. It is believed that the only prior art disclosing a closed form, real-time solution to the control problem is the doctoral thesis of Hee-Chang Eun, entitled *On the Dynamics and Control of Constrained Mechanical and Structural Systems*. However this work was limited to trajectories that are not dependent on measurement parameters, and had a restrictive limitation on the weighting of control forces. Also, Hee-Chang's work requires {1,2,3,4} inversion of matrices, which is computationally restrictive.

SUMMARY

The present invention meets the needs by a control system wherein closed form control forces are determined in real time and applied to satisfy specific trajectory requirements of a physical plant which can be a nonlinear mechanical system. Generally, the present invention provides a system and method for determining exact control forces to be applied to any nonlinear mechanical system so that certain physical points in the system follow user defined trajectory requirements. As used herein, trajectory requirements are mathematical relationships between measurement quantities. The trajectory requirements can have functional dependence on a measurement vector such as position in space, velocity of the measurement vector and time; and the user also has the ability to apply weighting factors to the control forces. Further, fast computation of control forces that includes matrix manipulation is enabled using any {1,4} inverse of a computed matrix that is derived from dynamic attributes and measurements of the system. Moreover, the weighted control force resources are minimized at each instant of time, not just in an overall sense for the complete trajectory. Thus the invention provides a closed form, real-time solution to the problem of the control of non-linear mechanical and structural systems.

In one aspect of the invention, a control system is provided for operating a physical plant to follow predetermined desired trajectory requirements, wherein forces acting on the elements can include inertial forces, externally applied forces, and control forces, the plant having interrelated mechanical elements and a response characteristic described by $M(x,t)\ddot{x}=F(x,\dot{x},t)$ in generalized coordinates $x(t)$ wherein F is exclusive of control forces. The control system includes a control computer; means for storing in the computer values corresponding to M and F of the response characteristic; means for measuring a p-vector $y(t)$ related to $x(t)$; means for specifying the trajectory requirements as $h_i(y,\dot{y},t)=0$, $i=1,2,\ldots,s$ and/or $g_i(y,t)=0$, $i=1,2,\ldots,(m-s)$; means for transforming and storing in the computer the trajectory requirements as $\ddot{h}=-f^{(1)}(h,t)$ and/or $\ddot{g}=-f^{(2)}(g,\dot{g},t)$, wherein a fixed point $h=0=g=\dot{g}$ is asymptotically stable within a domain of attraction that includes deviations from the trajectory requirements; means for determining control forces as $$F^c = G^*\left(\left[\begin{array}{c} D(h)-f^{(1)}(h,t) \\ \tilde{D}(g)-f^{(2)}(g,\dot{g},t) \end{array}\right] - \left[\begin{array}{c} \frac{\partial h}{\partial \dot{y}} \\ \frac{\partial g}{\partial y} \end{array}\right]\left[\begin{array}{c} 0 \\ \tilde{D}(\varphi) \end{array}\right] - \left(\left[\begin{array}{c} \frac{\partial h}{\partial \dot{y}} \\ \frac{\partial g}{\partial y} \end{array}\right]\left[\begin{array}{c} C \\ \frac{\partial \varphi}{\partial x} \end{array}\right]\right)M^{-1}F\right),$$

G* being any {1,4} inverse of $BM^{-1}$; and means for driving the plant by the control forces, thereby to generate the desired trajectory.

The response characteristic of the plant can be nonlinear. The control system can further include means for storing a positive definite matrix N for weighting of control forces; and wherein the means for determining control forces is further responsive to the matrix N, whereby $$F^c = N^{-1/2}G^*\left(\left[\begin{array}{c} D(h)-f^{(1)}(h,t) \\ \tilde{D}(g)-f^{(2)}(g,\dot{g},t) \end{array}\right] - \left[\begin{array}{c} \frac{\partial h}{\partial \dot{y}} \\ \frac{\partial g}{\partial y} \end{array}\right]\left[\begin{array}{c} 0 \\ \tilde{D}(\varphi) \end{array}\right] - \left(\left[\begin{array}{c} \frac{\partial h}{\partial \dot{y}} \\ \frac{\partial g}{\partial y} \end{array}\right]\left[\begin{array}{c} C \\ \frac{\partial \varphi}{\partial x} \end{array}\right]\right)M^{-1}F\right).$$

G* being any {1,4} inverse of $B(N^{1/2}M)^{-1}$.

The trajectory transformation equations $\ddot{h}=-f^{(1)}(h,t)$ and $\ddot{g}=-f^{(2)}(g,\dot{g},t)$ can be globally asymptotically stable at the point $h=0=g=\dot{g}$. The p-vector can be linearly related to the response vector $x(t)$. Alternatively, the means for specifying the p-vector further includes means for specifying a k-subvector being linearly related to the system response vector $x(t)$; means for specifying a (p-k)-subvector having components being nonlinear functions of elements of the vector $x(t)$ and possibly the time t; and means for determining physical values of the elements of the vector $x(t)$ that are in the (p-k)-subvector.

In another aspect of the invention, a method for controlling the plant to follow predetermined desired trajectory requirements includes the steps of:

(a) providing a control computer, (b) determining and storing in the computer a response characteristic of the plant as a matrix of force elements being related to a matrix of mass elements and acceleration in a vector of generalized coordinates $x(t)$;

(c) specifying a measurement p-vector $y(t)$ related to $x(t)$;

(d) specifying the trajectory requirements as $h_i(y,\dot{y},t)=0$, $i=1,2,\ldots,s$ and/or $g_i(y,t)=0$, $i=1,2,\ldots,(m-s)$;

(e) transforming and storing in the computer the trajectory requirements as $\ddot{h}=-f^{(1)}(h,t)$ and/or $\ddot{g}=-f^{(2)}(g,\dot{g},t)$, wherein a fixed point $h=0=g=\dot{g}$ is asymptotically stable within a domain of attraction that includes deviations from the trajectory requirements;

(f) determining and storing in the computer measurements of the p-vector;

(g) determining control forces as $$F^c = G^* \left( \begin{bmatrix} D(h) - f^{(1)}(h, t) \\ \tilde{D}(g) - f^{(2)}(g, \dot{g}, t) \end{bmatrix} - \begin{bmatrix} \frac{\partial h}{\partial \dot{y}} \\ \frac{\partial g}{\partial y} \end{bmatrix} \begin{bmatrix} 0 \\ \tilde{D}(\varphi) \end{bmatrix} - \left( \begin{bmatrix} \frac{\partial h}{\partial \dot{y}} \\ \frac{\partial g}{\partial y} \end{bmatrix} \begin{bmatrix} C \\ \frac{\partial \varphi}{\partial x} \end{bmatrix} \right) M^{-1} F \right),$$

G* being any {1,4} inverse of BM$^{-1}$;

(h) applying the control forces; and (i) repeating steps (f–h) for generating a control trajectory of the plant corresponding to the trajectory requirements.

The method can include the further step of specifying a positive definite matrix N for weighting of control forces, and wherein the step of determining control forces uses $$F^c = N^{-1/2} G^* \left( \begin{bmatrix} D(h) - f^{(1)}(h, t) \\ \tilde{D}(g) - f^{(2)}(g, \dot{g}, t) \end{bmatrix} - \begin{bmatrix} \frac{\partial h}{\partial \dot{y}} \\ \frac{\partial g}{\partial y} \end{bmatrix} \begin{bmatrix} 0 \\ \tilde{D}(\varphi) \end{bmatrix} - \left( \begin{bmatrix} \frac{\partial h}{\partial \dot{y}} \\ \frac{\partial g}{\partial y} \end{bmatrix} \begin{bmatrix} C \\ \frac{\partial \varphi}{\partial x} \end{bmatrix} \right) M^{-1} F \right)$$

G* being any {1,4} inverse of B(N$^{1/2}$M)$^{-1}$.

The step of specifying the p-vector can include the further steps of:

(a) specifying a k-subvector being linearly related to the system response vector x(t);

(b) specifying a (p-k)-subvector having components being nonlinear functions of elements of the vector x(t) and possibly the time t; and (c) determining physical values of the elements of the vector x(t) that are in the (p-k)-subvector.

DRAWINGS

These and other features, aspects, and advantages of the present invention will become better understood with reference to the following description, appended claims, and accompanying drawings, where:

FIGS. 3A and 3B are plotted comparisons of desired and actual trajectories for respective first and second case implementations of the system of FIG. 1 having the exemplary plant portion of FIG. 2.

FIGS. 4A and 4B are plots of a first joint angle $\theta_1$ of the plant portion of FIG. 2 for the respective first and second case implementations of FIGS. 3A and 3B;

FIGS. 5A and 5B are plots of a second joint angle $\theta_2$ of the plant portion of FIG. 2 for the respective first and second case implementations of FIGS. 3A and 3B;

FIGS. 6A and 6B are plots of a control torque on a first joint of the plant portion of FIG. 2 for the respective first and second case implementations of FIGS. 3A and 3B;

FIGS. 7A and 7B are plots of a control torque on a second joint of the plant portion of FIG. 2 for the respective first and second case implementations of FIGS. 3A and 3B;

FIGS. 8A and 8B are plots of a control torque on a third joint for the respective first and second case implementations of FIGS. 3A and 3B;

Figure 1:
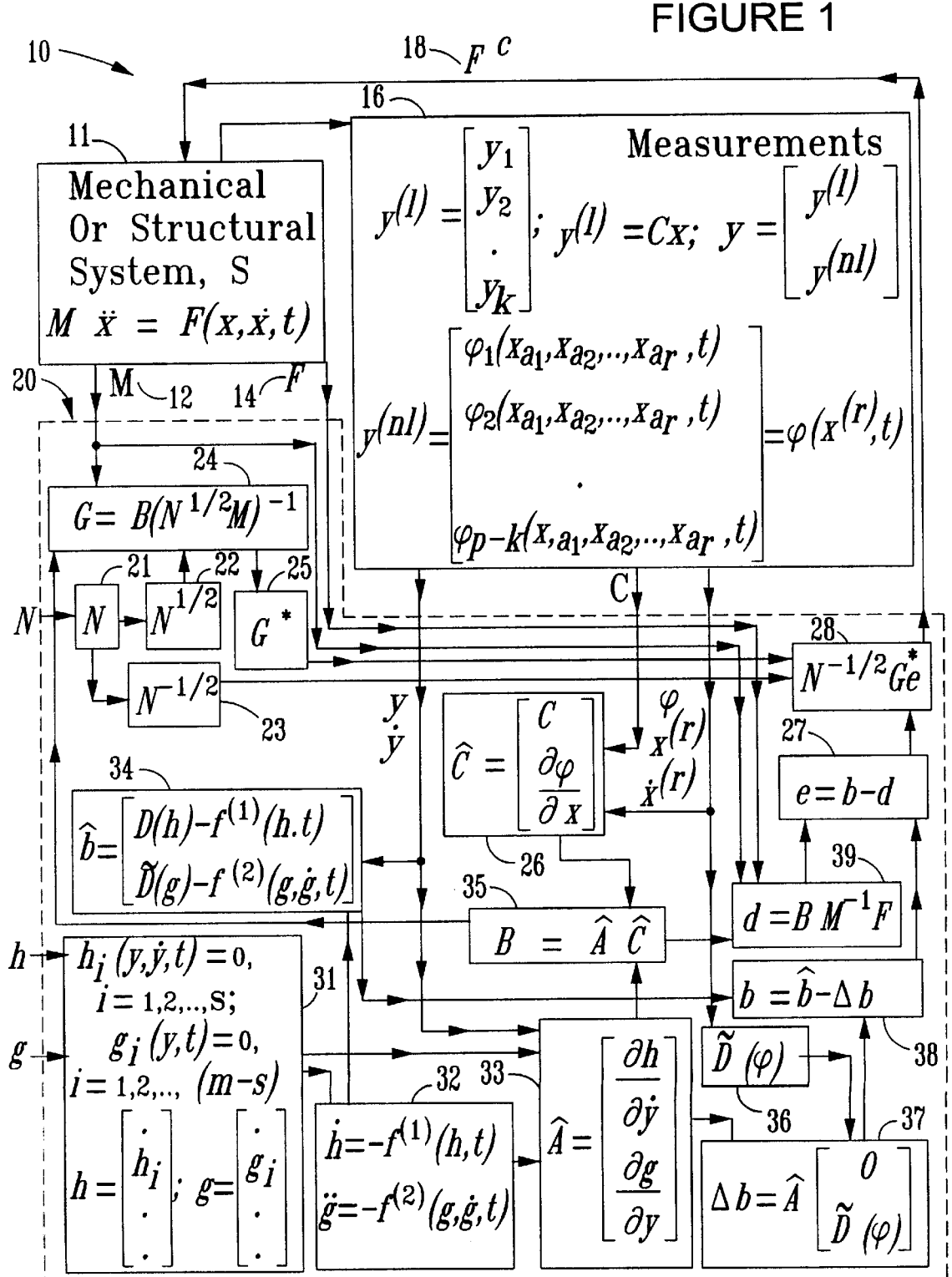
FIG. 1 is a schematic block diagram illustrating a preferred control system according to the invention.
Figure 2:
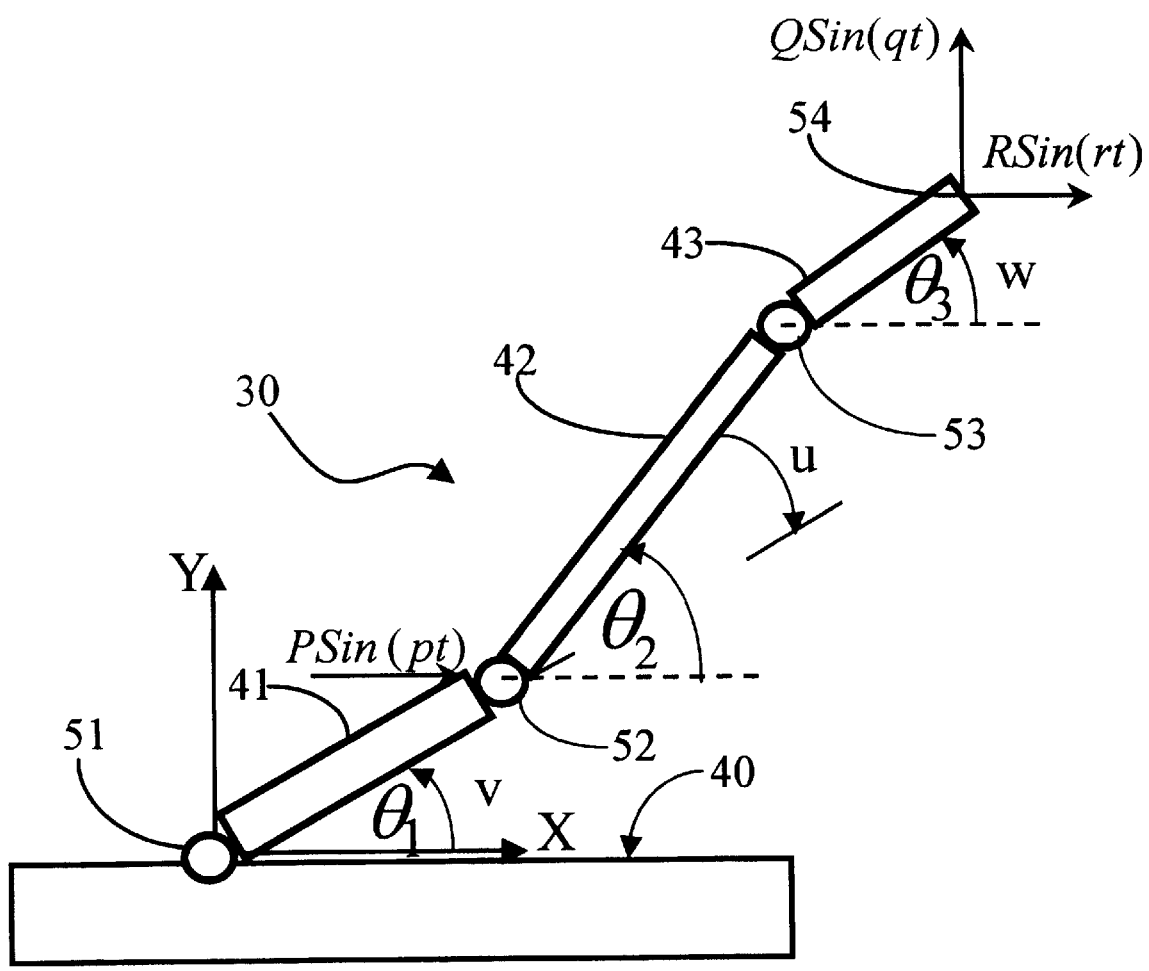
FIG. 2 is a pictorial diagram of an exemplary 3-link robot arm plant portion of the control system of FIG. 1.
Figure 10B:
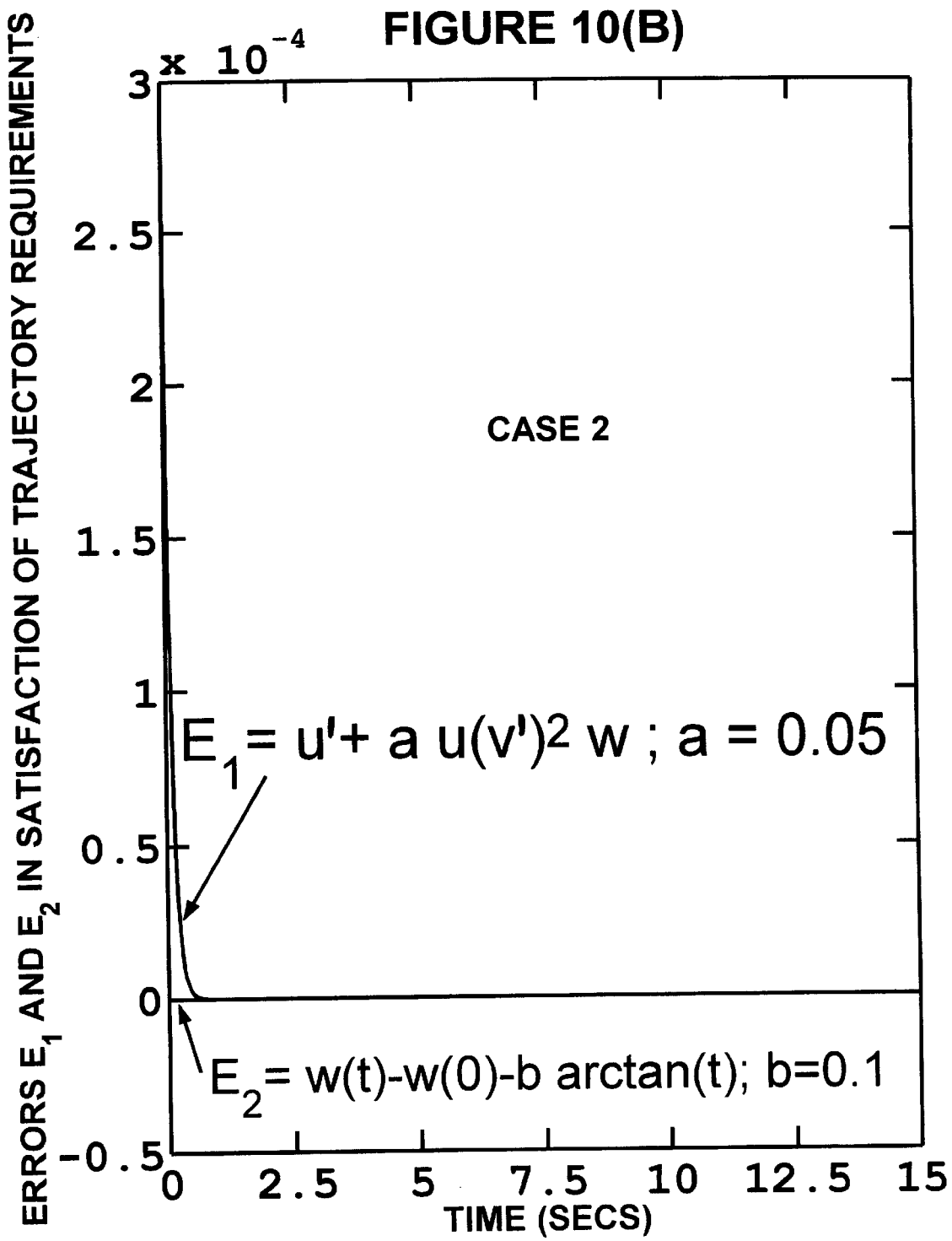
Figure 12:
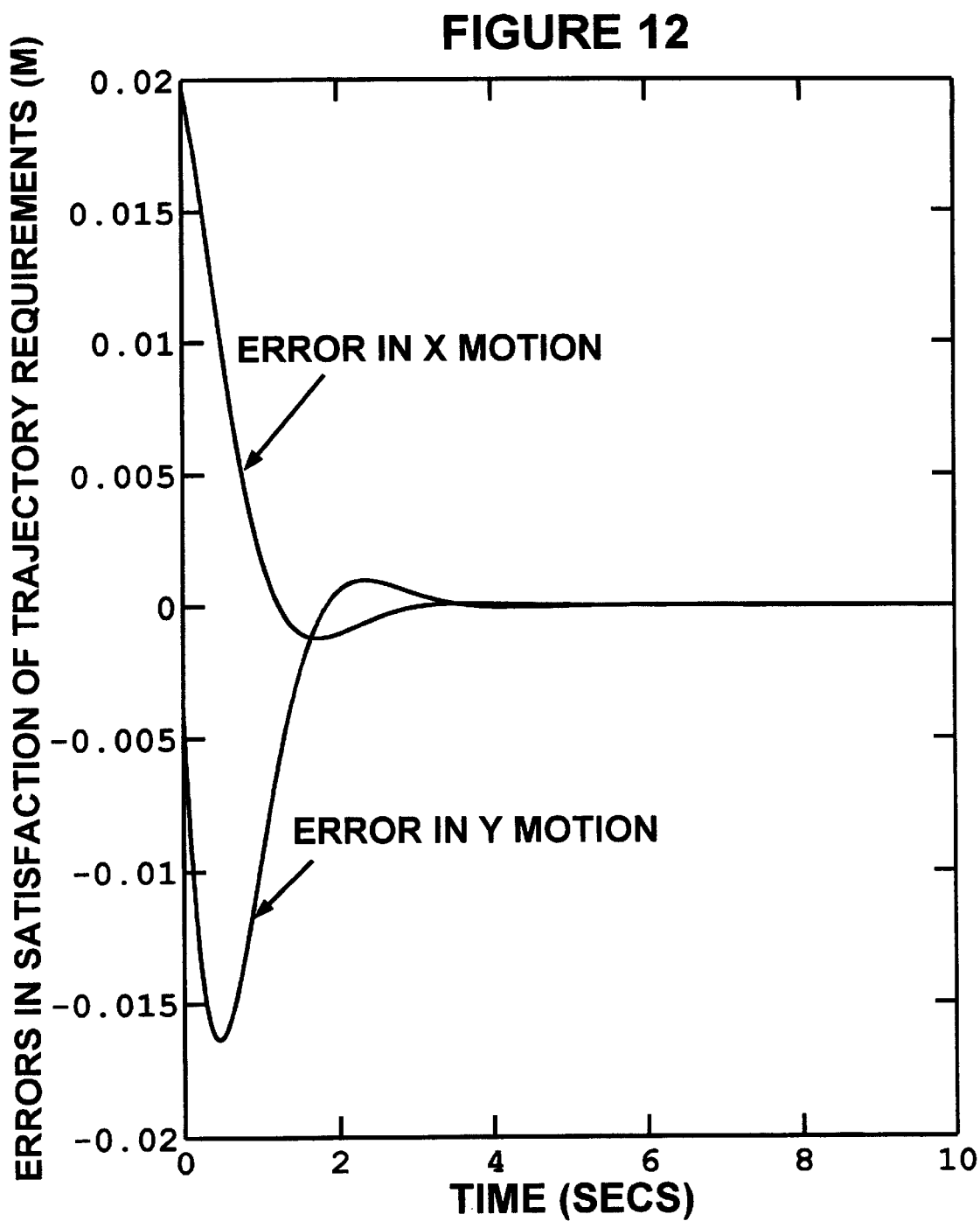

FIGS. 9A and 9B, and FIGS. 9C and 9D are plots of respective errors $E_1$ and $E_2$ in satisfaction of the trajectory requirements for the respective first and second case implementations of FIGS. 3A and 3B;

FIGS. 10A and 10B are plots of errors in satisfaction of the trajectory requirements for the respective first and second case implementations of FIGS. 3A and 3B when starting from an incorrectly measured initial state;

FIG. 11 is a plotted comparison of desired and actual trajectories for a third case implementation of the system of FIG. 1 having the exemplary plant portion of FIG. 2 when starting from an incorrectly measured initial state; and FIG. 12 are plotted coordinate errors in satisfaction of the trajectory requirements of the implementation for the third case implementation, showing rapid convergence to the exact trajectory requirements.

DESCRIPTION

The present invention is directed to a control system that is particularly effective in utilizing motive resources of a physical plant for satisfying trajectory requirements that depend on measurements, without imposing excessive computational complexity. Principally, required control forces are determined so that specific trajectory requirements can be exactly satisfied by a given nonlinear mechanical system. The invention uses measurements of state variables, and transforms the measured velocity and displacement trajectory requirements of the plant into required accelerations, and thereby applies "exact" control forces to the mechanical system. Multiple control forces can be advantageously weighted by matrix manipulation for conserving plant resources and improving response dynamics. Further to ensure robustness in the satisfaction of the constraint requirements, these transformed constraint requirements can be further transformed and incorporated into any system of differential equations which ensures that the original constraint requirements are asymptotically always satisfied. The above-identified transformations can be done in a single step. The transformation of original constraint requirements in terms of accelerations allows indusion of trajectory requirements which are (a) not integrable, (b) integrable, or (c) a mix of the two. Further, the specific matrix manipulations permit functionally dependent trajectory requirements to be satisfied without ill-effects; the simple matrix manipulations carried out in accordance with the invention lead to the production in real time of the exact control forces which minimize the weighted control cost at each instant of time. The simplicity and speed of the method makes it amenable to real time digital or analog control.

With reference to FIG. 1 of the drawings, a control system 10 according to the present invention includes a mechanical or structural system (or plant) 11 that is generally described by the following equation $$M(x,t)\ddot{x} = F(x, \dot{x}, t), x(0) = x_0, \dot{x}(0) = \dot{x}_0 \quad \text{(Eq.1)}$$

where, t is time, x(t) is an n-vector of generalized coordinates, and M represents an n by n mass matrix M 12 that is positive definite. F represents a vector F 14 that contains externally applied generalized forces on the plant 11 along with inertial forces, which may be functions of x, $\dot{x}$ and t. The mechanical plant 11 may be linear or nonlinear, conservative or non-conservative. The control system 10 determines a specific generalized control force n-vector F$^c$ to be applied at each instant of time to the system (plant 11) described by Equation (1), so that the controlled system which is now described by the equation $M(x,t)\ddot{x} = F(x, \dot{x}, t) + F^c$ satisfies given user-prescribed trajectory requirements.

Measurements

The mechanical plant 11 has n-degrees of freedom and a p-measurement vector y(t) 16 comprising a k-subvector, the components of which are each linearly related to the response x(t) of the system; and a (p-k)-subvector, the components thereof being nonlinear functions of some r, $1 \leq r \leq n$, elements $x_{a_1}, x_{a_2}, \ldots, x_{a_r}$, of the vector x(t). Here, each $a_i$ belongs to the set of numbers 1 to n. The vector y(t) is given by the following equation:

$$y(t) = \begin{bmatrix} y^{(l)}(t) \\ y^{(nl)}(t) \end{bmatrix} = \begin{bmatrix} Cx(t) \\ \varphi(x^{(r)}(t), t) \end{bmatrix} \quad \text{(Eq.2)}$$

where C is a constant k by n matrix, and the (p-k)-vector $\Phi$ has each of its components as a function of the vector $x^{(r)}(t) = [x_{a_1}, x_{a_2}, \ldots, x_{a_r}]^T$, and possibly the time t. These measurements y(t) and $\dot{y}(t)$ taken from the system are utilized in the following way to find the control forces which ensure that the system satisfies a given set of trajectory requirements.

Desired Trajectory

The main idea behind the present invention is to find and apply a control force $F^c(t)$ 18 using a control computer 20 so that the mechanical plant 11 follows the user-specified trajectory requirements 31 given by the following equations:

$$h_i(y, \dot{y}, t) = 0, i = 1, 2, \ldots, s; \quad \text{(Eq.3)}$$

and $$g_i(y, t) = 0, i = 1, 2, \ldots, (m-s) \quad \text{(Eq.4)}$$

Trajectory requirements specified by Equations (3) and (4) must be physically meaningful in that the system should be able to satisfy them. Equations (3) and (4) describing the trajectory requirements are specified as implicit functions. Instead of implicitly describing the trajectory requirements by h and/or g, they may also be explicitly described so that $\dot{y}$ is an explicit function of y,t and/or y is an explicit function of t. Further, the equation h=0 31 could be integrable, or nonintegrable, and the equations h=0 and g=0 31 could be linear or nonlinear in their arguments. By integrable is meant that Equation (3) could be integrated to yield a requirement of the form of Equation (4); by nonintegrable, is meant that Equation (3) cannot be integrated without knowledge of the state, x, of the system, which in turn cannot be determined a priori without knowledge of the control forces needed to satisfy the trajectory requirements given by Equation (3).

The transformation of the trajectory requirement equations into a form that makes computation of $F^c$ 18 robust and efficient is best achieved by having derivatives of trajectory requirement equations 31 represented by any equations 32 such that h=0=g is a fixed point for the transformed equations 32 and this fixed point is globally asymptotically stable. The equations 32 are the following:

$$(i) \dot{h} = -f^{(1)}(h, t), \quad \text{(Eq.5a)}$$

h being an s-vector with components $h_i$, so that $h(t) \to 0$ as $t \to \infty$. An example is $\dot{h} = -\nabla V(h)$, where V(h) is a positive definite, radially unbounded function with V(0)=0, then h=0 is globally asymptotically stable. Another example is $\dot{h}_i = -\alpha_i h_i$, $1 \leq i \leq s$, with constants $\alpha_i > 0$ for $1 \leq i \leq s$; here, global exponential asymptotic stability of h=0 is obtained. Yet another example is $\dot{h}_i = -\alpha_i t h_i$, and $\alpha_i > 0$ for $1 \leq i \leq s$, with asymptotic convergence to h=0.

$$(ii) \dot{g} = -f^{(2)}(g, \dot{g}, t) \quad \text{(Eq.5b)}$$

g being an (m-s) vector with components $g_i$, so that g(t), $\dot{g}(t) \to 0$ as $t \to \infty$. An example is $\ddot{g}_i = -(\alpha_i \dot{g}_i + \beta_i g_i)$, with $\alpha_i > 0$, $\beta_i > 0$, for $1 \leq i \leq (m-s)$. Another example is $\ddot{g}_i = -(\zeta_i \dot{g}_i + \omega_i g_i + \eta_i g^3)$, with constants $\zeta_i$, $\omega_i > 0$ and constants $\eta_i > 0$, for $1 \leq i \leq (m-s)$.

Equations (5a) and (5b) that are not globally asymptotically stable may also be used to represent the derivatives of trajectory equations 32, provided that the fixed point h=0=g=$\dot{g}$ of equation 32 has a large enough domain of attraction, thereby ensuring that the trajectories starting in that domain asymptotically approach the fixed point h=0=g=$\dot{g}$. By domain of attraction is meant the region in phase space (h,g,$\dot{g}$) from which trajectories are attracted to the fixed point h=0=g=$\dot{g}$.

Differentiating Equations (3) and (4) gives $$\frac{\partial h_i}{\partial \dot{y}} \ddot{y} = -\left[\frac{\partial h_i}{\partial t} \dot{y} + \frac{\partial h_i}{\partial t}\right] \equiv D(h_i); i = 1, 2, \ldots, s; \quad \text{(Eq.6)}$$

and $$\frac{\partial g_i}{\partial y} \ddot{y} = -\left[\frac{\partial^2 g_i}{\partial t^2} + 2\frac{\partial}{\partial y}\left(\frac{\partial g_i}{\partial t}\right) \dot{y} + \dot{y}^T \frac{\partial^2 g_i}{\partial y^2} \dot{y}\right] \equiv \tilde{D}(g_i(y, t)); \quad \text{(Eq.7)}$$

$$i = 1, 2, \ldots, (m-s),$$

where the operator $$\frac{\partial}{\partial y}$$

is a p-dimensional row vector, and the operators $D(h_i)$ and $\tilde{D}(g_i(y,t))$ are defined in equations (6) and (7) respectively. For computational ease, Equations (6) and (7), along with Equations (5a) and (5b) are combined to give the following:

$$\hat{A}(y, \dot{y}, t) \ddot{y} \equiv \begin{bmatrix} \frac{\partial h}{\partial \dot{y}} \\ \frac{\partial g}{\partial y} \end{bmatrix} \ddot{y} = \begin{bmatrix} \frac{\partial h}{\partial \dot{y}} \\ \frac{\partial g}{\partial y} \end{bmatrix} \begin{bmatrix} \dot{y}^{(l)} \\ \ddot{y}^{(nl)} \end{bmatrix} \quad \text{(Eq.8)}$$

$$= \begin{bmatrix} D(h) - f^{(1)}(h, t) \\ \tilde{D}(g) - f^{(2)}(g, \dot{g}, t) \end{bmatrix} \equiv \hat{b}(y, \dot{y}, t),$$

where the matrix $\hat{A}$ 33 is m by p, and the m-vector $\hat{b}$ 34 comprises the s-vector D(h) and the (m-s)-vector $\tilde{D}(g)$, the i-th component thereof being given by Equations 6 and 7 respectively.

Now, differentiating Equation (2) gives the following equation:

$$\ddot{y}(t) = \begin{bmatrix} \ddot{y}^{(l)}(t) \\ \ddot{y}^{(nl)}(t) \end{bmatrix} = \begin{bmatrix} C\ddot{x}(t) \\ \frac{\partial \varphi}{\partial x} \ddot{x} + \tilde{D}(\varphi) \end{bmatrix} = \begin{bmatrix} C \\ \frac{\partial \varphi}{\partial x} \end{bmatrix} \ddot{x} + \begin{bmatrix} 0 \\ \tilde{D}(\varphi) \end{bmatrix}, \quad \text{(Eq.9)}$$

where the components, $\tilde{D}(\Phi_i(x,t))$, of the (p-k)-vector $\tilde{D}(\Phi)$ 36 are defined in a manner corresponding to that in Equation (7). Using Equation (9) in Equation (8) gives the following equation:

$$B(y, \dot{y}, x^{(r)}, t)\ddot{x} \equiv \hat{A}\begin{bmatrix} C \\ \frac{\partial \varphi(x^{(r)}, t)}{\partial x} \end{bmatrix}\ddot{x} = \hat{b} - \hat{A}\begin{bmatrix} 0 \\ \tilde{D}(\varphi(x^{(r)}, t)) \end{bmatrix} \quad \text{(Eq.10)}$$

$$\equiv b(y, \dot{y}, x^{(r)}, \dot{x}^{(r)}, t),$$

where B 35 is an m by n matrix, and is a product of $\hat{A}$ 33 and the p by n matrix $\hat{C}$ 26. The vector b 38 is defined to represent the right hand side of Equation (10) and is calculated as:

$$b = \hat{b} - \Delta b, \quad \text{(Eq.11)}$$

where $\Delta b$ 37 is given by:

$$\Delta b = \hat{A}\begin{bmatrix} 0 \\ \tilde{D}(\varphi(x^{(r)}, t)) \end{bmatrix}. \quad \text{(Eq.12)}$$

If all measurements are linearly related to the system response x(t), then the measurement p-vector in Equation (2) consists of only $y^{(1)}$ and Equation (10) simplifies to:

$$B(y,\dot{y},t)\ddot{x} = \hat{A}C\ddot{x} = \hat{b} = b, \quad \text{(Eq.13)}$$

where both matrix B and vector b are determined from measurements y, $\dot{y}$ and time t.

Control Force Weighting

The present invention allows weighting of the control forces using N as representing any n by n matrix N 21 that is positive definite. The values of elements in the matrix N may be any predetermined amounts depending on the specific control forces desired for the situation. For example, if one joint in a mechanical system is required to handle less torque than others for structural reasons, then the torque on that joint may be given a higher weighting.

The control forces $F^c$ 18 are then computed by minimizing at each instant of time the following cost quantity J given by:

$$J(t) = (F^c)^T N(x(t),t) F^c \quad \text{(Eq.14)}$$

where N(x(t),t) 21 is the weighting matrix at each instant of time t. An example of N(x(t),t) is $N=M^{-½}(x(t),t)$; another is N equal to a suitable diagonal matrix all of whose diagonal elements are positive constants.

The magnitude of the control forces $F^c$ 18, which will cause the mechanical plant 11 to exactly follow the trajectory requirements 32, is then computed as:

$$F^c = N^{-½} G^* [b - BM^{-½} F] = N^{-½} G^* [b-d] \quad \text{(Eq.15)}$$

where G* denotes any {1,4} inverse of the matrix G, and the matrix G denotes the matrix $G = B(N^{1/2}M)^{-1}$. A proof of Equation (15) is given below.

Proof of Eq. 15

Let $$z(t) = N^{1/2} F^c = N^{1/2}(M\ddot{x} - F), \quad \text{(Eq.A1)}$$

then $$J(t) = \|z(t)\|_2^2, \quad \text{(Eq.A2)}$$

and from Equation (A1) the following equation, $$\ddot{x} = (N^{1/2} M)^{-1}(z + N^{1/2} F), \quad \text{(Eq.A3)}$$

is obtained.

Since the controlled system must satisfy Equation (10), $$B\ddot{x} = b \quad \text{(Eq.A4)}$$

Using equation (A3) in equation (A4), the controlled system must satisfy the relation $$B(N^{1/2}M)^{-1}(z + N^{1/2} F) = b \quad \text{(Eq.A5)}$$

which yields, after setting $G = B(N^{1/2}M)^{-1}$, $$Gz = b - BM^{-1} F. \quad \text{(Eq.A6)}$$

But the vector z which satisfies (Eq.A6) while minimizing (Eq.A2) is given by $$z(t) = G^*(b - BM^{-1} F), \quad \text{(Eq.A7)}$$

where G* is any {1,4}-inverse of the matrix G.

Using z from Equation (A7) in Equation (A1), the relation $$F^c = N^{-½} G^*(b - BM^{-1} F) \quad \text{(Eq.A8)}$$

is obtained.

Control Force Output

Now, using the predetermined values of N 21, the values of $N^{1/2}$ 22 and $N^{-½}$ 23 are computed. Next, using B 35, $N^{1/2}$ 22, and M 12, the value of G 24 is computed as $$G = B(N^{1/2}M)^{-1} \quad \text{(Eq.16)}$$

G* 25 is any {1,4} inverse of G 24.

Using the matrix M 12, the force vector F 14 and the computed value of B 35, a value of d(t) 39 is calculated as $$d(t) = BM^{-1} F. \quad \text{(Eq.17)}$$

The value of e(t) 27 is then calculated as the difference between b(t) 38 and d(t) 39 so that $$e(t) = b(t) - d(t). \quad \text{(Eq.18)}$$

Computation of the exact control force $F^c$ 18 is performed in box 28 using the values of $N^{-½}$ 23, G* 25, and e(t) 27, $$F^c = N^{-½} G^* e(t). \quad \text{(Eq.19)}$$

Control Computer

As shown in FIG. 1, the control computer 20 receives and stores the mass matrix M 12, the force matrix F 14, the weighting matrix N 21, and the h and g trajectory definitions 31. It will be understood that these definitions can be fixed in firmware or otherwise incorporated in a control program that is loaded into the computer 20 when the control program is dedicated to controlling a single previously defined plant 11. However, it is contemplated that some or all of these definitions are variable, either in connection with the use of the computer 20 with different embodiments of the plant 11, with a variably configurable plant 11, or when the trajectory and/or weighting definitions are not fixed. The control computer 20 also receives and processes the measurements y 16 and outputs the control forces $F^c$, in analog and/or digital form. Analog processing is continuous, digital processing being discrete in both value and time. Normally, the processing of digital data is in a rapid repetitive fashion. The computer 20 implements computations as described above for each of the blocks 22–28 and 31–39. In digital implementations, the computations can utilize fixed-point or floating-point math, floating-point being suitable in most applications. Preferred digital implementations of the control computer 20 include 32-bit microprocessors such as those of the 68000-series microprocessors that are available from Motorola Corp. of Phoenix, Ariz., and the 486-, 586-, and 686-series microprocessors that are available from Intel Corp. of Sunnyvale, Calif. A suitable program environment that provides floating-point operations for implementing the operations to be performed by the control computer 20 is available as MATLAB® from Mathworks Inc. of Natick, Mass. In a so, MATLAB environment on a personal computer such as Model XPS-90 of Del Corp., Dover Del., several million floating-point operations (FLOPS) are performed per second. The blocks 26–28 and 33–39 are preferably implemented for rapid processing in that a they generate real-time control loop variables. Thus when high sampling rates and/or rapid transient response are required, some or all of these blocks can be implemented for reduced processing delays using methods that are within the skill of control system programmers. In many applications implementing the present invention, resort to special programming techniques is not required. When the trajectory requirements define a physical trajectory having movements on the order of meters, the level of accuracy of the controlled motion can typically be $10^{-6}$ meter (one micron).

In accordance with the above, the present invention provides a method for controlling a mechanical system or plant which can be nonlinear, conservative or non-conservative as described by $$M(x,t)\ddot{x}=F(x,\dot{x},t),$$

a preferred implementation of the method including the steps of:

(a) Specifying a measurement vector including a k-subvector being linearly related to the system response vector x(t) and a (p-k)subvector having components being nonlinear functions of elements of the vector x(t) and possibly the time t;

(b) Determining physical values of the elements of the vector x(t) that are in the (p-k)-subvector;

(c) Specifying trajectory requirements of the form $h_i(y, \dot{y},t)=0, i=1,2,\ldots,s$ and/or $g_i(y,t)=0, i=1,2,\ldots,(m-s)$;

(d) Transforming the trajectory requirements as $\ddot{h}=-f^{(1)}(h,t)$, and/or $\ddot{g}=-f^{(2)}(g,\dot{g},t)$ wherein $\ddot{h}=-f^{(1)}(h,t)$, and $\ddot{g}=-f^{(2)}(g,\dot{g}, t)$ are asymptotically stable within a domain of attraction about a fixed point $h=0=g=\dot{g}$, the domain of attraction being sufficiently large to include deviations from the specified trajectory requirements;

(e) Specifying a positive definite matrix N of any magnitude for a desired weighting of control forces;

(f) Measuring the elements of the p-vector;

(g) Determining specific control forces $F^c=N^{-\frac{1}{2}}G^* e(t)$ wherein $G^*$ is any $\{1,4\}$-inverse of the matrix G, thereby minimizing $J(t)=(F^c)^T N(x(t), t)F^c$ at every instant of time;

(h) Applying the control forces to the plant and (i) Repeating steps f-h, thereby generating the control trajectory in operation of the plant.

EXAMPLE

With further reference to FIGS. 2–12, the performance of the model proposed in FIG. 1 was examined in computer simulation experiments using a three-link robot arm 30 shown in FIG. 2. The robot arm 30 has three degrees of freedom in the vertical plane and represents a simple physical embodiment of the model plant 11 of FIG. 1. The arm 30 operates relative to a rigid horizontal body or base 40, and includes respective first, second, and third links 41, 42, and 43 that are serially connected end-to-end to the base 40 by corresponding first, second, and third pivotable joints 51, 52, and 53, the first joint 51 being located on the base 40. The third link 43 acts as an end-effector arm, a free end thereof defining an effector tip 54. The simulation experiments were directed to satisfaction of various trajectory requirements by the system 10. At each of the joints 51, 52 and 53 is a torque motor which can apply a torque to control the motion of the robot arm in response to the control computer 20.

The masses of the three links 41, 42, and 43 are $m_1$, $m_2$, $m_3$, respectively; their moments of inertia about their centers of mass are $I_1$, $I_2$, $I_3$, respectively. The properties of the various links, the joint stiffnesses and the joint dampings of the robot arm 30 are shown in Table 1. They are chosen to represent a typical industrial robot. The quantities $k_1$, $k_2$, and $k_3$ are the spring stiffnesses (in units of torque/rad) at the three joints 51, 52, and 53, respectively, and the quantities $c_1$, $c_2$, and $c_3$ are the corresponding damping values (in units of torque-sectrad) at these three joints. The second joint 52 is subjected to a horizontal force Psin(pt), and the end-effector tip 54 is subjected to a horizontal force Qsin(qt) and a vertical force Rsin(rt).

TABLE 1

| | Physical Parameters of Robot Arm 30 | | |
|---|---|---|---|
| Parameter | Link 41 / Joint 51 / $\theta_1$ | Link 42 / Joint 52 / $\theta_2$ | Link 43 / Joint 53 / $\theta_3$ |
| Mass of link (kg) | 50 | 50 | 20 |
| Length of link (m) | 2 | 2 | 0.8 |
| Joint Stiffness, k (N-m/rad) | 300 | 300 | 200 |
| Joint Damping, c N-m-sec/rad | 8 | 8 | 6 |

Three cases were considered for demonstrating different features of the invention. In each case, the magnitudes of the external disturbing forces on the robot arm 30 of FIG. 2 are as follows: P=100N; Q=300N; R=200N; p=q=1 rad/sec; r=-1 rad/sec. It should be noted that these "disturbing forces" are of the same order of magnitude as the forces exerted by gravity on the robot links. The specific task required of the method in the test simulation is the determination of the torques (generalized forces) needed to be applied at the joints 51, 52 and 53 of the robotic arm 30 of FIG. 2 to satisfy particular trajectory requirements using a defined set of measurements of the arm 30.

Plant Dynamics of Example

The equation of motion of the uncontrolled system is described by the equation:

$$M\ddot{x}=f=-\{L\dot{x}+K_s x+C_d \dot{x}+e\}+f^{(e)} \quad \text{(Eq.20)}$$

where, $$x = \begin{bmatrix} \theta_1 \\ \theta_2 \\ \theta_3 \end{bmatrix}; e = \begin{bmatrix} q_1 \cos(\theta_1) \\ q_2 \cos(\theta_2) \\ q_3 \cos(\theta_3) \end{bmatrix}; \tilde{x} = \begin{bmatrix} \dot{\theta}_1^2 \\ \dot{\theta}_2^2 \\ \dot{\theta}_3^2 \end{bmatrix}; f^{(e)} = \begin{bmatrix} f_1^{(e)} \\ f_2^{(e)} \\ f_3^{(e)} \end{bmatrix}; \quad \text{(Eq.21)}$$

$$M = \begin{bmatrix} a_1 & b_1 c_{12} & b_2 c_{31} \\ b_1 c_{12} & a_2 & b_3 c_{23} \\ b_2 c_{31} & b_3 c_{23} & a_3 \end{bmatrix}; \quad \text{(Eq.22)}$$

$$L = \begin{bmatrix} 0 & b_1 s_{12} & -b_2 s_{31} \\ -b_1 s_{12} & 0 & b_3 s_{23} \\ b_2 s_{31} & -b_3 s_{23} & 0 \end{bmatrix};$$

and, $$K_s = \begin{bmatrix} k_1 + k_2 & -k_2 & 0 \\ -k_2 & k_2 + k_3 & -k_3 \\ 0 & -k_3 & k_3 \end{bmatrix}; \quad \text{(Eq.23)}$$

$$C_d = \begin{bmatrix} c_1 + c_2 & -c_2 & 0 \\ -c_2 & c_2 + c_3 & -c_3 \\ 0 & -c_3 & c_3 \end{bmatrix}.$$

Here, $$a_1 = I_1 + (m_1/4 + m_2 + m_3) l_1^2; \; a_2 = I_2 + (m_2/4 + m_3) l_2^2; \; a_3 = I_3 + m_3/4 l_3^2 \text{(Eq.24)}$$

$$b_1 = (m_2/2 + m_3) l_1 l_2; \; b_2 = m_3/2 l_1 l_3; \; b_3 = m_3/2 l_2 l_3; \quad \text{(Eq. 25)}$$

$$q_1 = (m_1/2 + m_2 + m_3) \bar{g} l_1; \; q_2 = (m_2/2 + m_3) \bar{g} l_2; \; q_3 = m_3 \bar{g} l_3/2, \quad \text{(Eq.26)}$$

where $\bar{g}$ is acceleration due to gravity, 9.81 m/sec$^2$;

$$c_{ij} = \cos(\theta_i - \theta_j); \; s_{ij} = \sin(\theta_i - \theta_j); \quad \text{(Eq. 27)}$$

$$f_1^{(e)} = l_1 \cos(\theta_1) R \sin(rt) - l_1 \sin(\theta_1) \{P \sin(pt) + Q \sin(qt)\}; \quad \text{(Eq.28)}$$

$$f_2^{(e)} = l_2 \cos(\theta_2) R \sin(rt) - l_2 \sin(\theta_2) Q \sin(qt); \quad \text{(Eq.29)}$$

and, $$f_3^{(e)} = l_3 \cos(\theta_3) R \sin(rt) - l_3 \sin(\theta_3) Q \sin(qt). \quad \text{(Eq.30)}$$

The initial conditions are set forth below in Tables 2, 3, and 4, respectively, which summarize the details of the simulations for corresponding Cases 1, 2, and 3.

Measurements and Trajectory Requirements

In Case 1 and Case 2, angular measurements u(t), v(t), and w(t) are defined as follows:

$$u(t) = \theta_1(t) - \theta_2(t); \quad \text{(Eq.31)}$$

$$v(t) = \theta_1(t); \quad \text{(Eq.32)}$$

and $$w(t) = \theta_3(t), \quad \text{(Eq.33)}$$

so that the following trajectory requirements are satisfied:

$$h_1(u,v,w,\dot{u},\dot{v},\dot{w};t) = \dot{u}(t) + au(t)\dot{v}^2(t)w(t) = 0, \quad \text{(Eq.34)}$$

and $$g_1(u,v,w,t) = w(t) - \{w(0) + b \tan^{-1}(t)\} = 0, \quad \text{(Eq.35)}$$

which need to be maintained during the motion of the system through the imposition of a control force 3-vector F$^c$. Thus the measurement vector y(t) = [u v w]$^T$. The measurements are linear functions of the angles. The system 10 is started from initial (equilibrium) conditions at time t=0. Since the measurements are linear functions of the coordinates x(t), equation 13 (B(,y,ẏ,t)ẍ≡ÂCẍ=b̂=b) can be used as described above to obtain the trajectory requirements in the required form.

Thus $$\hat{A} = \begin{bmatrix} \frac{\partial h}{\partial \dot{y}} \\ \frac{\partial g}{\partial y} \end{bmatrix} = \begin{bmatrix} 1 & 2au\dot{v}w & 0 \\ 0 & 0 & 1 \end{bmatrix}; C = \begin{bmatrix} 1 & -1 & 0 \\ 1 & 0 & 0 \\ 0 & 0 & 1 \end{bmatrix}; \quad \text{(Eq.36)}$$

so that matrix B in equation 13 is given by $$B = \hat{A}C = \begin{bmatrix} 1 + 2au\dot{v}w & -1 & 0 \\ 0 & 0 & 1 \end{bmatrix}. \quad \text{(Eq.37)}$$

Results

Case 1 determines the specific control torques at joints 51, 52 and 53 of FIG. 2 so that the above mentioned trajectory requirements are satisfied. It illustrates the use of functions $f^{(1)}(h,t)$ and $f^{(2)}(g,\dot{g},t)$ which are time dependent and nonlinear, respectively, and a weighting matrix N for the control torques at the joints 51, 52, and 53 which is dependent on the mass matrix M of the system. The {11,4}-generalized inverse G* 25 was utilized in determining the specific control torques to be applied at the joints 51, 52, and 53 as functions of time. Given the data at any time (t), the computations for digitally determining the control forces for each of blocks 22–28 and 31–39 in the MATLAB environment include approximately 4635 FLOPS, which translates into a processing time of one millisecond or less on most personal computers. It will be understood that in most cases a subset only of the blocks (blocks 26–28 and 33–39, for example) is required to be repetitively computed, significantly reducing the processing time in successive cycles. The specific details of Case 1 are summarized in the Table 2 which follows.

TABLE 2

| | Case 1 |
|---|---|
| Measurements | $u(t) = \theta_1(t) - \theta_2(t);$ $v(t) = \theta_1(t); w(t) = \theta_3(t);$ |
| Initial Conditions | |
| $\theta_{t=0}$ (rad) | $\theta_1 = 2; \theta_2 = 1.384; \theta_3 = 1.226$ |
| $\dot{\theta}_{t=0}$ (rad/sec) | $\theta_1 = 0.2; \theta_2 = 0.2016; \theta_3 = 0.1$ |
| Trajectory Requirements | $h = \dot{u}(t) + au(t)\dot{v}^2(t)w(t) = 0;$ $a = 0.05$ $g = w(t) - w(0) - b \arctan(t) = 0;$ $b = 0.10$ |
| Function $f^{(1)}(h,t)$ | $\delta_0 h; \delta_0 = 10$ |
| Function $f^{(2)}(g,\dot{g},t)$ | $\zeta_0 g + \zeta_1 \sin(g); \zeta_0 = 3; \zeta_1 = 5$ |
| Weighting Matrix N | $M^{-1/2}$ |
| G* | {1,4}-generalized inverse |

Case 2 (see Table 3) requires that specific control torques be determined to fulfill the same trajectory requirements as for Case 1, but a different weighting matrix N for the control torques at each of the joints 51, 52, and 53 of FIG. 2 is specified. These weightings on the control torques are of practical importance and are usually related to the capabilities of the torque motors located at each of the three joints.

The specific weighting matrix shown in Table 3 below illustrates a requirement that more weight be placed on reducing the control torque at the first joint 51 in comparison to that at the second and third joints 52 and 53. The computations for each of blocks 22–28 and 31–39 now include only approximately 1310 FLOPS, significantly fewer than in Case 1, above. The simulation also illustrates by example that a different function $f^{(1)}(h,t)$ could be substituted for the one used in Case 1 (see Tables 2 and 3).

TABLE 3

| | Case 2 |
|---|---|
| Measurements | $u(t) = \theta_1(t) - \theta_2(t);$ $v(t) = \theta_1(t); w(t) = \theta_3(t);$ |
| Initial Conditions | |
| $\theta_{t=0}$ (rad) | $\theta_1 = 2; \theta_2 = 1.384; \theta_3 = 1.226$ |
| $\dot{\theta}_{t=0}$ (rad/sec) | $\dot{\theta}_1 = 0.2; \dot{\theta}_2 = 0.2016; \dot{\theta}_3 = 0.1$ |
| Trajectory Requirements | $h = \dot{u}(t) + au(t)\dot{v}^2(t)w(t) = 0;$ $a = 0.05$ $g = w(t) - w(0) - b \arctan(t) = 0;$ $b = 0.10$ |
| Function $f^{(1)}(h,t)$ | $\delta_0 h + \delta_1 h^3; \delta_0 = 10; \delta_1 = 5$ |
| Function $f^{(2)}(g,\dot{g},t)$ | $\zeta_0 \dot{g} + \zeta_1 \sin(g); \zeta_0 = 3; \zeta_1 = 5$ |
| Weighting Matrix N | Diag[10, 1, 1] |
| G* | {1,4}-generalized inverse |

Figure 5A:
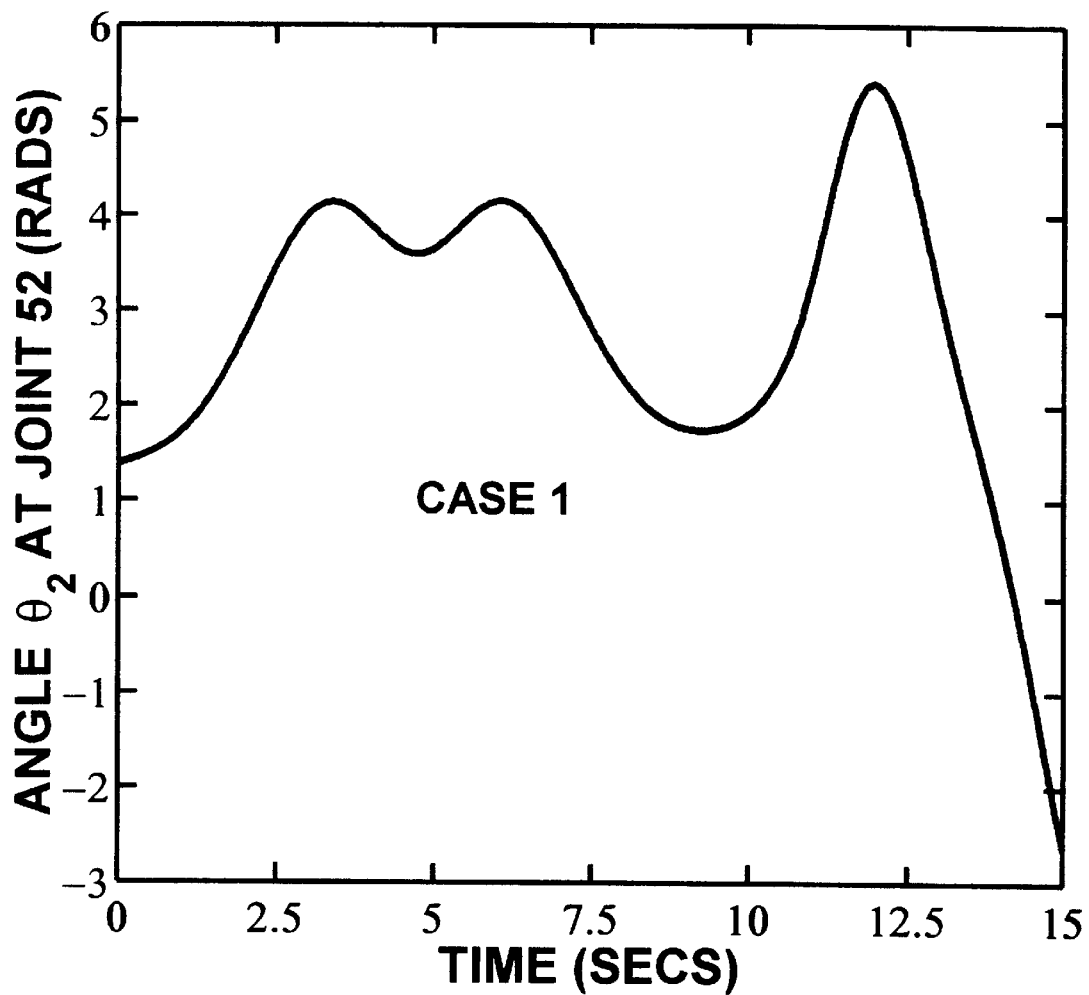
Figure 6A:
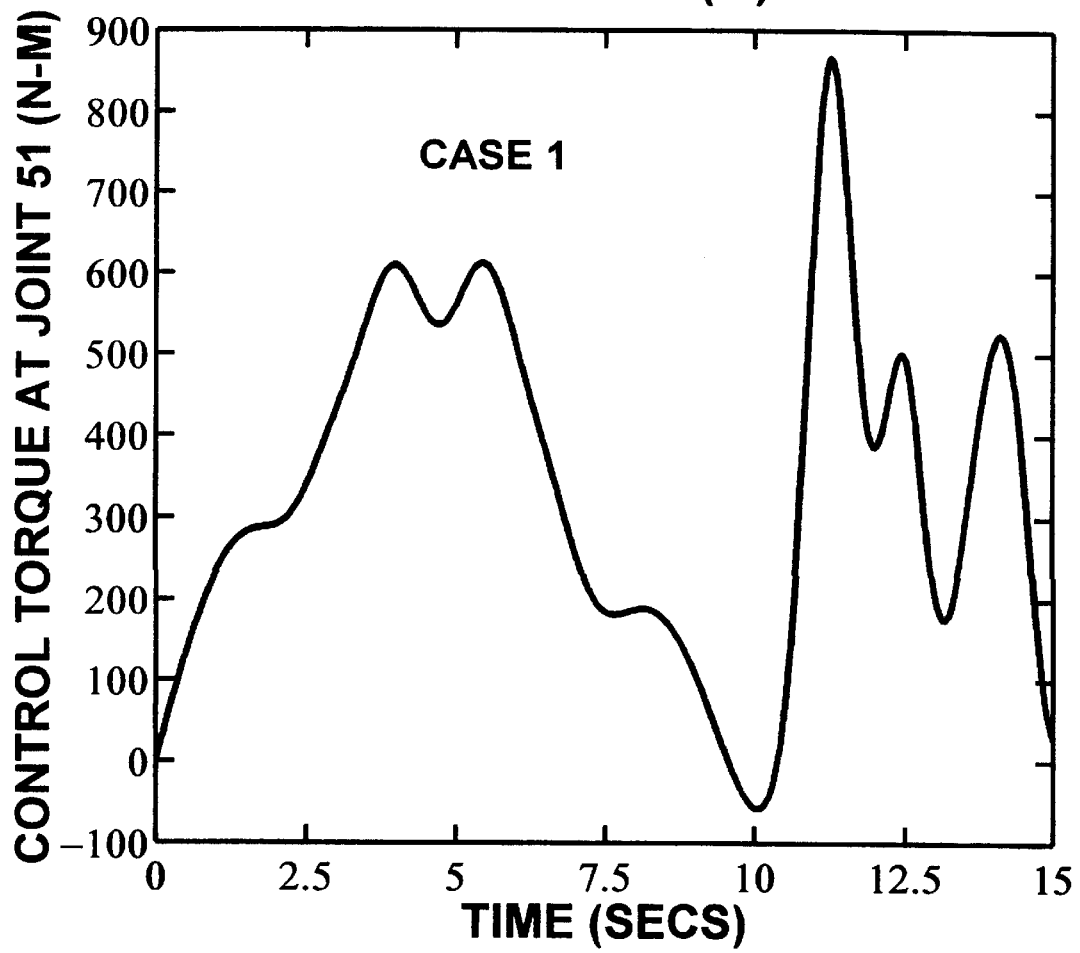
Figure 9A:
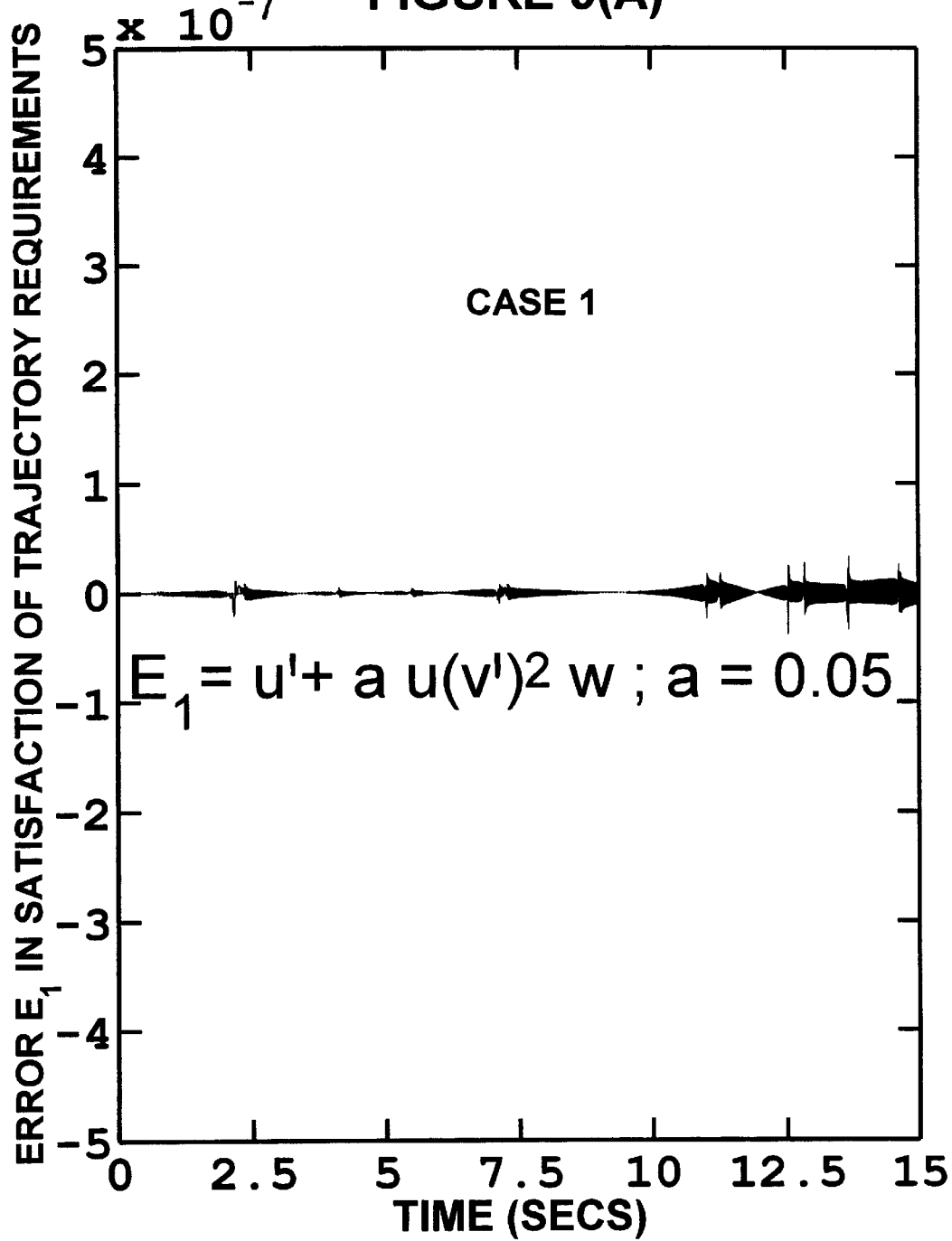
Figure 9D:
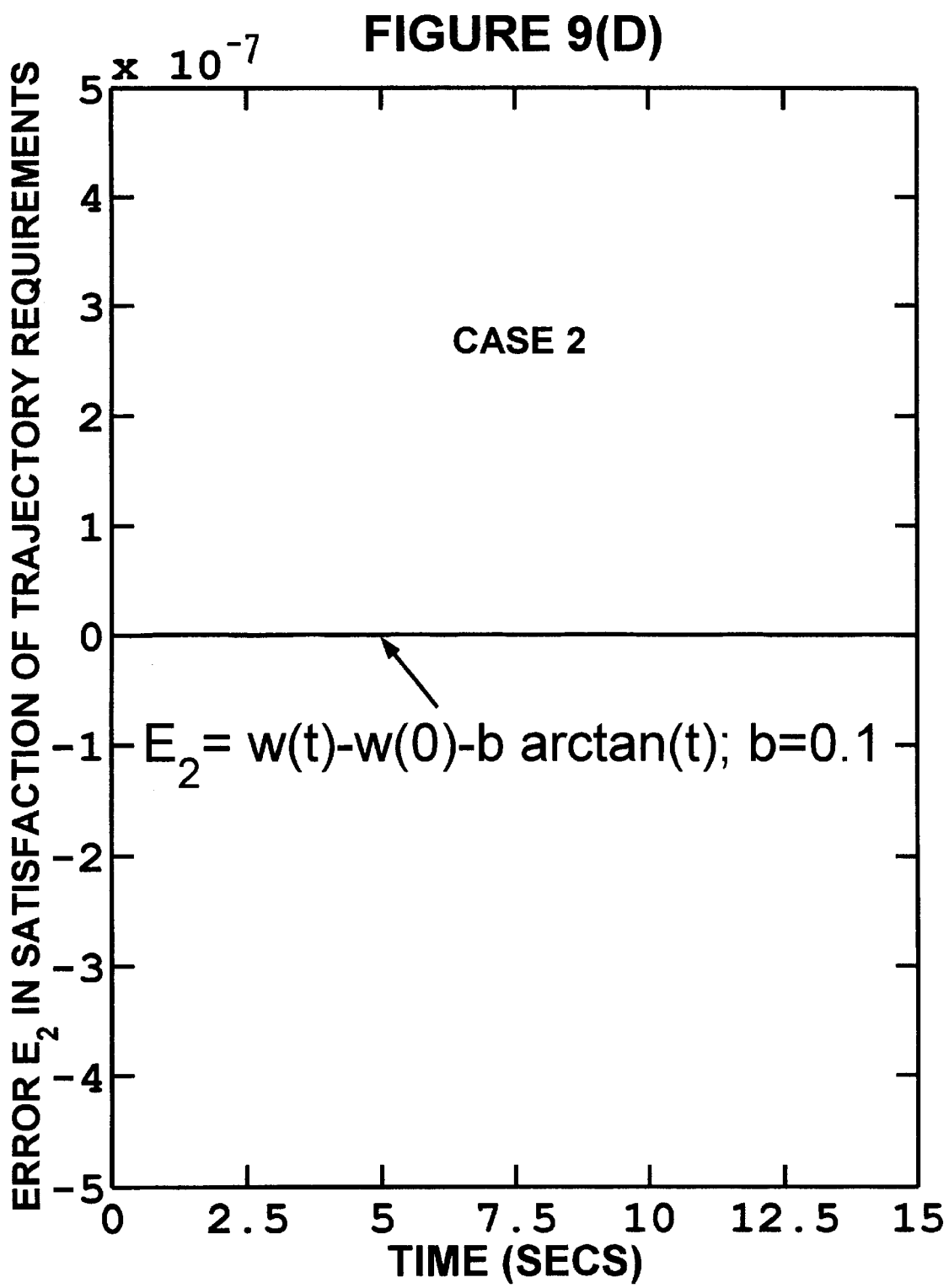

A comparison of desired and actual trajectories of $w(t) = \theta_3(t)$ at joint 53 of FIG. 2 for Cases 1 and 2 is shown in FIGS. 3A and 3B respectively. Note in FIGS. 3A and 3B that the actual trajectory follows exactly the desired trajectory in each case, thereby giving a single line plot of trajectories with respect to time. The actual motions of the joints 51 and 52 are shown in FIGS. 4 and 5 respectively. FIGS. 6, 7 and 8 show the specific control torque on joints 51, 52, and 53, respectively, required to be employed for the system to satisfy the given trajectory requirements. Note in FIG. 6 that the control torque on joint 51 is significantly lower for Case 2 than the corresponding torque for Case 1. In Case 2, a diagonal matrix with higher weighting for control torque for joint 51 compared with joints 52 and 53 was specified. This allowed the user to reduce the required control torque on joint 51. The errors in the satisfaction of the two trajectory requirements for Cases 1 and 2 are given in FIG. 9. The trajectory requirements demand that h and g be zero for all time. The errors plotted in FIG. 9 are $E_1 \equiv h$ and $E_2 \equiv g$, see Tables 2 and 3 above. Note the y-scales of the plots; both these errors are of the order of the relative error bound ($10^{-8}$) used in numerically integrating the differential equations in the simulation.

FIGS. 10A and 10B deal with the same two Cases 1 and 2, respectively, except that the initial condition $\theta_2$ at t=0 of the robot arm 51 is taken to be in error by 0.1 rad. so that $\theta_2(t=0)=1.284$ rads. for each case. The initial state thus does not satisfy the trajectory requirement h=0. Note how the errors in the satisfaction of the trajectory requirements for both Cases 1 and 2 rapidly go to zero, indicating that these requirements get rapidly satisfied even when the system starts off by initially violating them.

Case 3 illustrates the determination of the specific control torques required at joints 51, 52 and 23 of FIG. 2 so that the end-effector tip 54 of the robot executes a "figure-8" trajectory. Measurements are made at the tip of the end effector; these measurements are nonlinear functions of the state. The simulation experiment in Case 3 includes the effect of an error in the measurement of the initial state of the robotic system. It is shown that if there is an initial error at time t=0 between the desired and actual trajectory requirements, the control forces which are determined according to this invention cause the actual trajectory to rapidly converge to satisfy the desired trajectory requirements. Measurements are made at: xtip, x-coordinate of tip of end-effector arm 43 in FIG. 2; ytip, y-coordinate of tip of end-effector arm 43 in FIG. 2. The other particulars for Case 3 are summarized in Table 4.

A comparison of desired and actual trajectory requirements of the end-effector tip 54 of FIG. 2 for Case 3 is shown in FIG. 11. Note in FIG. 11 that the actual trajectory which has an initial error at t=0 converges rapidly to the desired trajectory. After converging, the actual trajectory follows exactly the desired trajectory. The variation of error (with respect to time) in the satisfaction of the trajectory requirements is given in FIG. 12 which shows that this error rapidly reaches zero. The error is extremely small, being approximately one micron, the range of movement being approximately 0.4 meter. This is the same order of magnitude as the integration errors in the computations done by the control computer 20.

TABLE 4

| | CASE 3 |
|---|---|
| Measurements | xtip: x-coordinate of the tip of end effector 54 ytip: y-coordinate of the tip of end effector 54 |
| Initial Conditions | |
| $\theta_{t=0}$ (rad) | $\theta_1 = 2; \theta_2 = 1.384 - \text{error}^*; \theta_3 = 1.226$ |
| $\dot{\theta}_{t=0}$ (rad/sec) | $\dot{\theta}_1 = 0.3; \dot{\theta}_2 = -3.357; \dot{\theta}_3 = 7.93$ |
| Trajectory Requirements | $g_1(\theta_1,\theta_2,\theta_3,t) = \text{xtip}(t) -$ $\{\text{xtip}(0) + b + b\cos(\pi - \alpha t)\};$ $g_2(\theta_1,\theta_2,\theta_3,t) = \text{ytip}(t) -$ $\{\text{ytip}(0) + b\sin(\pi - \beta t)\}$ $\alpha = 1$ rad/sec; $\beta = 2$ rad/sec; $b = 0.2$ m |
| Function $f_1^{(2)}(\dot{g}_1, g_1, t)$ | $\delta_0 \dot{g}_1 + \delta_1 \sin(g_1); \delta_0 = 3; \delta_1 = 5$ |
| Function $f_1^{(2)}(\dot{g}_2, g_2, t)$ | $\zeta_0 \dot{g}_2 + \zeta_1 \sin(g_2); \zeta_0 = 3; \zeta_1 = 5$ |
| Weighting Matrix N | $M^{-1/2}$ |
| G* | {1,4}-generalized inverse |

*error = 0.01 rads.

Conclusion

The marked advantages of the present invention, which are believed to advance the state of the art, include the following:

1. It provides exact control force so that the mechanical system satisfies a set of user defined trajectory requirements. These trajectory requirements may be: integrable or nonintegrable equations; linear or nonlinear equations; explicit or implicit equations in y and $\dot{y}$. If there is an offset between the trajectory requirements and the initial state of the system, the offset is rapidly eliminated.
2. It allows weighting of control forces using any positive definite matrix N, thereby enabling the use of optimal control forces that minimize $F^{cT}NF^c$.
3. It minimizes $F^{cT}NF^c$ at every instant of time. Prior controllers minimized integral $$\int_0^{T_o} F^{cT}NF^c dt,$$

thereby introducing inaccuracies and perturbations in the compliance of actual trajectory requirements with required trajectory requirements.

4. It allows using any {1,4} inverse of the matrix G, which is faster to compute than a {1,2,3,4} inverse.

5. It executes the trajectory requirements as measured. The measurements may be linear or non-linear functions of the state of the system. The trajectory requirements may be integrable or nonintegrable or a combination of both. The only limitation is that the specified trajectory requirements should be physically attainable. An example is that the trajectory requirements cannot specify an end effector to be at two different locations at the same time, or to have two different velocities at the same time.

6. It provides flexibility in trajectory definition by allowing a combination of requirements, some requirements on measurement y and t, and others tS on measurements y, y and t, and still others on just $\dot{y}$ and t.

7. It allows using any set of differential equations 5A and 5B as long as the fixed point $h=g=\dot{g}=0$ of these equations is globally asymptotically stable, or the fixed point $h=g=\dot{g}=0$ is asymptotically stable within a domain of attraction which includes any deviations from the desired trajectory requirements.

8. It eliminates the need to determine whether the trajectory requirements are functionally independent. Optimal control procedures of the prior art are believed to present great difficulties with trajectory requirements that are not independent.

Although the present invention has been described in considerable detail with reference to certain preferred versions thereof, other versions are possible. The invention has application in diverse dynamical systems such as the control of multiple spacecraft required to move in formation. Therefore, the spirit and scope of the appended claims should not necessarily be limited to the description of the preferred versions contained herein.

What is claimed is:

1. A control system for operating a physical plant having interrelated mechanical elements and a response characteristic described by $M(x,t)\ddot{x}=F(x,\dot{x},t)$ in generalized coordinates x(t) to follow predetermined desired trajectory requirements, wherein forces that can act on the elements include inertial forces, externally applied forces and control forces, F being exclusive of control forces, the system comprising:

(a) a control computer;
    (b) means for storing in the computer values corresponding to M and F of the response characteristic;
    (c) means for measuring a p-vector y(t) related to x(t);
    (d) means for specifying the trajectory requirements as $h_i(y,\dot{y},t)=0, i=1,2,\ldots,s$ and/or $g_i(y,t)=0, i=1,2,\ldots,(m-s)$;
    (e) means for transforming and storing in the computer the trajectory requirements as $\dot{h}=-f^{(1)}(h,t)$ and/or $\ddot{g}=-f^{(2)}(g,\dot{g},t)$, wherein a fixed point $h=0=g=\dot{g}$ is asymptotically stable within a domain of attraction that includes deviations from the trajectory requirements;
    (f) means for determining control forces as $$F^c = G^* \left( \begin{bmatrix} D(h) - f^{(1)}(h,t) \\ \tilde{D}(g) - f^{(2)}(g,\dot{g},t) \end{bmatrix} - \begin{bmatrix} \frac{\partial h}{\partial y} \\ \frac{\partial g}{\partial y} \end{bmatrix} \begin{bmatrix} 0 \\ \tilde{D}(\varphi) \end{bmatrix} - \left( \begin{bmatrix} \frac{\partial h}{\partial y} \\ \frac{\partial g}{\partial y} \end{bmatrix} \begin{bmatrix} C \\ \frac{\partial \varphi}{\partial x} \end{bmatrix} \right) M^{-1} F \right),$$

(g) means for driving the plant by the control forces, thereby to generate the desired trajectory therein.

2. The control system of claim 1, wherein the response characteristic of the plant is nonlinear.

3. The control system of claim 1, further comprising:

(a) means for storing a positive definite matrix N for weighting of control forces; and
    (b) wherein the means for determining control forces is further responsive to the matrix N, whereby $$F^c = N^{-1/2} G^* \left( \begin{bmatrix} D(h) - f^{(1)}(h,t) \\ \tilde{D}(g) - f^{(2)}(g,\dot{g},t) \end{bmatrix} - \begin{bmatrix} \frac{\partial h}{\partial y} \\ \frac{\partial g}{\partial y} \end{bmatrix} \begin{bmatrix} 0 \\ \tilde{D}(\varphi) \end{bmatrix} - \left( \begin{bmatrix} \frac{\partial h}{\partial y} \\ \frac{\partial g}{\partial y} \end{bmatrix} \begin{bmatrix} C \\ \frac{\partial \varphi}{\partial x} \end{bmatrix} \right) M^{-1} F \right),$$

G* being any {1,4} inverse of $BM^{-1}$; and any {1,4} inverse of $B(N^{1/2}M)^{-1}$.

4. The control system of claim 3, wherein the response characteristic of the plant is nonlinear.

5. The control system of claim 3, wherein the trajectory transformation equations $\dot{h}=-f^{(1)}(h,t)$ and $\ddot{g}=-f^{(2)}(g,\dot{g},t)$ are globally asymptotically stable at the point $h=0=g=\dot{g}$.

6. The control system of claim 5, wherein the response characteristic of the plant is nonlinear.

7. The control system of claim 1, wherein the p-vector is linearly related to the response vector x(t).

8. The control system of claim 7, wherein the response characteristic of the plant is nonlinear.

9. The control system of claim 1, wherein the means for specifying the p-vector further comprises:

(a) means for specifying a k-subvector being linearly related to the system response vector x(t);
    (b) means for specifying a (p-k)-subvector having components being nonlinear functions of elements of the vector x(t) and possibly the time t; and
    (c) means for determining physical values of the elements of the vector x(t) that are in the (p-k)subvector.

10. The control system of claim 9, wherein the response characteristic of the plant is nonlinear.

11. A method for controlling a plant having interrelated mechanical elements and a response characteristic described by $M(x,t)\ddot{x}=F(x,\dot{x},t)$ in generalized coordinates x(t) to follow predetermined desired trajectory requirements, wherein forces that can act on the elements include inertial forces, externally applied forces and control forces, wherein F is exclusive of control forces, the method comprising the steps of:

(a) providing a control computer;
    (b) determining and storing in the computer a response characteristic of the plant as a matrix of force elements being related to a matrix of mass elements and acceleration in a vector of generalized coordinates x(t);
    (c) specifying a measurement p-vector y(t) related to x(t);
    (d) specifying the trajectory requirements as $h_i(y,\dot{y},t)=0, i=1,2,\ldots,s$ and/or $g_i(y,t)=0, i=1,2,\ldots,(m-s)$;
    (e) transforming and storing in the computer the trajectory requirements as $\dot{h}=-f^{(1)}(h,t)$ and/or $\ddot{g}=-f^{(2)}(g,\dot{g},t)$, wherein a fixed point $h=0=g=\dot{g}$ is asymptotically stable within a domain of attraction that includes deviations from the trajectory requirements;
    (f) determining and storing in the computer measurements of the p-vector;

(g) determining control forces as $$F^c = G^* \left( \begin{bmatrix} D(h) - f^{(1)}(h,t) \\ \tilde{D}(\dot{g}) - f^{(2)}(g,\dot{g},t) \end{bmatrix} - \begin{bmatrix} \frac{\partial h}{\partial \dot{y}} \\ \frac{\partial g}{\partial y} \end{bmatrix} \begin{bmatrix} 0 \\ \tilde{D}(\varphi) \end{bmatrix} - \left( \begin{bmatrix} \frac{\partial h}{\partial \dot{y}} \\ \frac{\partial g}{\partial y} \end{bmatrix} \begin{bmatrix} C \\ \frac{\partial \varphi}{\partial x} \end{bmatrix} \right) M^{-1} F \right),$$

$G^*$ being any $\{1,4\}$ inverse of $BM^{-1}$;

(h) applying the control forces; and (i) repeating steps (f–h) for generating a control trajectory of the plant corresponding to the desired trajectory.

12. The method of claim 11, comprising the further step of specifying a positive definite matrix N for weighting of control forces, and wherein the step of determining control forces uses $$F^c =$$

$$N^{-1/2} G^* \left( \begin{bmatrix} D(h) - f^{(1)}(h,t) \\ \tilde{D}(\dot{g}) - f^{(2)}(g,\dot{g},t) \end{bmatrix} - \begin{bmatrix} \frac{\partial h}{\partial \dot{y}} \\ \frac{\partial g}{\partial y} \end{bmatrix} \begin{bmatrix} 0 \\ \tilde{D}(\varphi) \end{bmatrix} - \left( \begin{bmatrix} \frac{\partial h}{\partial \dot{y}} \\ \frac{\partial g}{\partial y} \end{bmatrix} \begin{bmatrix} C \\ \frac{\partial \varphi}{\partial x} \end{bmatrix} \right) M^{-1} F \right),$$

$G^*$ being any $\{1,4\}$ inverse of $B(N^{1/2}M)^{-1}$.

13. The method of claim 12, wherein the response characteristic of the plant is nonlinear.

14. The method of claim 12, wherein the trajectory transformation equations $\ddot{h} = -f^{(1)}(h,t)$ and $\ddot{g} = -f^{(2)}(g,\dot{g},t)$ are globally asymptotically stable at the point $h=0=g=\dot{g}$.

15. The method of claim 14, wherein the response characteristic of the plant is nonlinear.

16. The method of claim 11, wherein the p-vector is linearly related to the response vector x(t).

17. The method of claim 16, wherein the response characteristic of the plant is nonlinear.

18. The method of claim 11, wherein the step of specifying the p-vector comprises the further steps of:

(a) specifying a k-subvector being linearly related to the system response vector x(t);

(b) specifying a (p-k)-subvector having components being nonlinear functions of elements of the vector x(t) and possibly the time t; and (c) determining physical values of the elements of the vector x(t) that are in the (p-k)-subvector.

19. The method of claim 18, wherein the response characteristic of the plant is nonlinear.

* * * * *

UNITED STATES PATENT AND TRADEMARK OFFICE
CERTIFICATE OF CORRECTION

PATENT NO. : 6,266,578 B1
DATED : July 24, 2001
INVENTOR(S) : Udawadia, Firdaus E.

It is certified that error appears in the above-identified patent and that said Letters Patent is hereby corrected as shown below:

Column 2,
Line 11, should read -- fixed point $h = 0 = g = \dot{g}$ is asymptotically . . --

Column 4,
Line 39, should read -- . . . Allows inclusion of trajectory . . . --

Column 5,
Line 42, should read -- . . . The equation h=0 31 could be integrable, . . . --
Line 43, should read -- . . . Equations h=0 and g=0 31 could be . . . --
Line 53, should read -- requirement equations 31 represented by any equations 32 --
Line 54, should read -- such that $h = 0 = g = \dot{g}$ is a fixed point . . . --

Line 56, should read -- tions 32 and this fixed point . . . --
Line 57, should read -- stable. The equations 32 are the following: --

Column 6,
Line 11, should read -- trajectory equations 32, provided that . . . --
Line 12, should read -- $\dot{g}$ of equation 32 has a large . . . --
Line 21, Equation 6, should read --
$$\frac{\partial h_i}{\partial \dot{y}} \ddot{y} = -\left[\frac{\partial h_i}{\partial y}\dot{y} + \frac{\partial h_i}{\partial t}\right] \equiv D(h_i)$$
--

Line 46, Equation 8, should read --
$$= \begin{bmatrix} D(h) - f^{(1)}(h,t) \\ \tilde{D}(g) - f^{(2)}(g,\dot{g},t) \end{bmatrix} \equiv \hat{b}(y,\dot{y},t).$$
--

Line 46, Equation 8, should read --
$$= \begin{bmatrix} D(h) - f^{(1)}(h,t) \\ \tilde{D}(g) - f^{(2)}(g,\dot{g},t) \end{bmatrix} \equiv \hat{b}(y,\dot{y},t).$$
--

Column 7,
Line 23, should read -- . . . of only $y^{(l)}$ and Equation (10) . . . --

Column 9,
Line 11, delete "so," should read -- . . . .In a MATLAB. . . --
Line 12, should read -- . . . XPS-90 of Dell Corp., Dover Del., . . . --
Line 15, delete "a"; should read -- . . . for rapid processing in that they . . . --

UNITED STATES PATENT AND TRADEMARK OFFICE
CERTIFICATE OF CORRECTION

PATENT NO. : 6,266,578 B1
DATED : July 24, 2001
INVENTOR(S) : Udawadia, Firdaus E.

It is certified that error appears in the above-identified patent and that said Letters Patent is hereby corrected as shown below:

Column 10,
Line 27, delete "t" and replace "/" should read -- of torque-sec/rad) at these three joints. . . . --
Table 1, should read -- (N-m-sec/rad) --

Column 11,
Equation 24, should read -- . . . ; $a_2 = I_2 + (m_2/4 + m_3)l_2^2$ ; . . . --
Equation 25, should read -- . . . ; $b_2 = m_3 / 2l_1 l_3$ ; . . . --
Equation 34, should read -- $h_1(u,v,w,\dot{u},\dot{v},\dot{w},t) = \dot{u}(t) + au(t)\dot{v}^2(t)w(t) = 0$ --

Column 12,
Line 4, delete the comma at the beginning of bracket; should read -- equation 13 $B(y,\dot{y},t)\ddot{x} \equiv \hat{A}C\ddot{x} = \hat{b} = b$ ) can .--
Line 29, should read -- ... of the system. The {1,4}- --
Lines 45-59, Table 2, replace '$\theta_1$' '$\theta_2$' and '$\theta_3$' with -- '$\dot{\theta}_1$', '$\dot{\theta}_2$' and '$\dot{\theta}_3$' -- in the second column of the second row below "Initial Conditions"

Column 13,
After line 10 to line 25, Table 3, replace '$\theta_1$' '$\theta_2$' and '$\theta_3$' with -- '$\dot{\theta}_1$', '$\dot{\theta}_2$' and '$\dot{\theta}_3$' -- in the second column of the second row below "Initial Conditions"
Line 61, should read -- . . . required at joints 51, 52 and 53 of FIG 2 so . . --

Column 14,
Table 4, Align "Weighting Matrix N" in first column of Table 4 and place it in the same row as "$M^{-1/2}$", which is in second column of Table 4 --
After line 20 to line 41, Table 4, replace '$\theta_1$' '$\theta_2$' and '$\theta_3$' with -- '$\dot{\theta}_1$', '$\dot{\theta}_2$' and '$\dot{\theta}_3$' -- in the second column of the second row below "Initial Conditions"

Column 15,
Line 15, delete "tS" from the line, should read -- ... , and others on measure- --
Line 16, should read -- ments $y$, $\dot{y}$, $t$ and still others . . . --
Line 60, should read
-- $$F^c = G^* \left( \begin{bmatrix} D(h) - f^{(1)}(h,t) \\ \tilde{D}(g) - f^{(2)}(g,\dot{g},t) \end{bmatrix} - \begin{bmatrix} \frac{\partial h}{\partial \dot{y}} \\ \frac{\partial g}{\partial y} \end{bmatrix} \begin{bmatrix} 0 \\ \tilde{D}(\varphi) \end{bmatrix} - \left( \begin{bmatrix} \frac{\partial h}{\partial \dot{y}} \\ \frac{\partial g}{\partial y} \end{bmatrix} \begin{bmatrix} C \\ \frac{\partial \varphi}{\partial x} \end{bmatrix} \right) M^{-1} F \right),$$
--

UNITED STATES PATENT AND TRADEMARK OFFICE
CERTIFICATE OF CORRECTION

PATENT NO. : 6,266,578 B1
DATED : July 24, 2001
INVENTOR(S) : Udawadia, Firdaus E.

It is certified that error appears in the above-identified patent and that said Letters Patent is hereby corrected as shown below:

<u>Column 15 (continued),</u>
Line 60, should read
--

$$F^c = G^* \left( \begin{bmatrix} D(h) - f^{(1)}(h,t) \\ \tilde{D}(g) - f^{(2)}(g,\dot{g},t) \end{bmatrix} - \begin{bmatrix} \frac{\partial h}{\partial \dot{y}} \\ \frac{\partial g}{\partial y} \end{bmatrix} \begin{bmatrix} 0 \\ \tilde{D}(\varphi) \end{bmatrix} - \left( \begin{bmatrix} \frac{\partial h}{\partial \dot{y}} \\ \frac{\partial g}{\partial y} \end{bmatrix} \begin{bmatrix} C \\ \frac{\partial \varphi}{\partial x} \end{bmatrix} \right) M^{-1}F \right),$$

--

$G^*$ being any $\{1,4\}$ inverse of $BM^{-1}$; and

<u>Column 16,</u>
Line 18, (after equation), delete "any $\{1,4\}$ inverse of $BM^{-1}$; and" should read -- $G^*$ being any $\{1,4\}$ inverse of $B(N^{1/2}M)^{-1}$ --

Signed and Sealed this

Eighteenth Day of June, 2002

*Attest:*

JAMES E. ROGAN
*Attesting Officer*     *Director of the United States Patent and Trademark Office*